United States Patent [19]
Ogata et al.

[11] Patent Number: 4,838,669
[45] Date of Patent: Jun. 13, 1989

[54] COMPACT ZOOM LENS SYSTEM

[75] Inventors: Yasuzi Ogata; Takao Ohi, both of Tokyo, Japan

[73] Assignee: Olympus Optical Co., Ltd., Tokyo, Japan

[21] Appl. No.: 169,475

[22] Filed: Mar. 17, 1988

[30] Foreign Application Priority Data

Mar. 17, 1987 [JP] Japan .................................. 62-60019
Apr. 24, 1987 [JP] Japan .................................. 62-99875
May 12, 1987 [JP] Japan .................................. 62-113569

[51] Int. Cl.$^4$ .......................... G02B 15/14; G02B 9/64
[52] U.S. Cl. ........................................ 350/427; 350/426
[58] Field of Search .............................. 350/427, 426

[56] References Cited

U.S. PATENT DOCUMENTS 4,682,860 7/1987 Tanaka et al. ........................ 350/426
4,720,179 1/1988 Ito ........................................ 350/426

FOREIGN PATENT DOCUMENTS 50201213 12/1982 Japan .
60-170816 9/1985 Japan .
60-191216 9/1985 Japan .
61-15115 1/1986 Japan .

Primary Examiner—John K. Corbin
Assistant Examiner—Rebecca D. Gass
Attorney, Agent, or Firm—Cushman, Darby & Cushman

[57] ABSTRACT

A zoom lens system having a short total length and a small outside diameter, comprising a front lens group having positive refractive power and a rear lens group having negative refractive power, and so designed as to change focal length by varying an airspace reserved between said lens groups; said front lens group consisting, in the order from the object side, of a positive meniscus lens, a negative lens and at least one positive lens, and said rear lens group consisting of a positive lens, a biconcave lens and a negative meniscus lens.

12 Claims, 27 Drawing Sheets

COMPACT ZOOM LENS SYSTEM

BACKGROUND OF THE INVENTION (1) Field of the Invention

The present invention relates to a compact zoom lens system, and more specifically to a zoom lens system having a short total length and suited for use with lens shutter cameras.

(2) Description of the Prior Art

As a zoom lens system having a field angle range including the standard field angle (on the order of $2\omega = 47°$) and a vari-focal ratio on the order of 2x, there is conventionally known a zoom lens system of the type which comprises a front lens group having negative refractive power and a rear lens group having positive refractive power, and performs variation of focal length by varying the airspace reserved between the lens groups. Since the zoom lens system of this type has the same composition as that of the retrofocus lens system, it has a merit to allow to reserve a space for arranging a mirror when said zoom lens system is used in a single-lens reflex camera. However, said zoom lens system has a long back focal length, thereby making it impossible to shorten the total length (the distance as measured from the object side surface of the first lens to the image surface), and comprises the front lens having a large diameter, thereby making it impossible to make said zoom lens system compact.

On the other hand, as a zoom lens system compact enough to be built in a lens shutter camera, there is known a zoom lens system which comprises a front lens group having positive refractve power and a rear lens group having negative refractive power. This zoom lens system is characterized in that it has the telephoto type of composition which makes it possible to shorten the total length of the zoom lens system. As the conventional examples of the zoom lens systems of this type, there are known the ones disclosed by Japanese Unexamined Patent Publication No. 201213/1982 (U.S. Pat. No. 4682860) and Japanese Unexamined Patent Publication No. 191216/1985. However, these conventional examples are designed for low vari-focal ratios on the order of 1.5 and do not correct aberrations with good balance. The zoom lens systems disclosed by Japanese Unexamined Patent Publication No. 170816/1985 and Japanese Unexamined Patent Publication No. 15115/1986 are known as the zoom lens systems of this type and having a vari-focal ratio attaining to 2, but have long total lengths. Further, these conventional examples have a defect that aberrations are not corrected sufficiently in the zoom lens systems.

SUMMARY OF THE INVENTION

In order to provide a zoom lens system having a field angle range including the standard field angle, a vari-focal ratio on the order of 2 and favorably corrected aberrations, the present invention adopts a lens type comprising a front lens group having positive refractive power and a rear lens group having negative refractive power, and designs a zoom lens system so as to satisfy the demands mentioned below:

(a) Shortening of total length of a zoom lens system (b) Reduction of outside diameters of lenses (c) Shortening of displacements of movable lens groups.

A primary object of the present invention is to provide a zoom lens system comprising a front lens group having positive refractive power and a rear lens group having negative refractive power, and performing variation of focal length by varying an airspace reserved between said lens groups, said front lens group comprising, in the order from the object side, a positive meniscus lens convex on the object side, a negative lens and at least one positive lens, and said rear lens group comprising, in the order from the object side, a positive lens, biconcave lens and a negative meniscus lens convex on the image side.

The zoom lens system according to the present invention is characterized in that the zoom lens system has the composition described above and is so designed as to satisfy the following condition (1):

$$-1 < \frac{r_a + r_b}{r_a - r_b} < 0.2 \qquad (1)$$

wherein the reference symbols $r_a$ and $r_b$ represent the radii of curvature on the object side surface and the image side surface respectively of the biconcave lens arranged in said zoom lens system. The above-mentioned condition (1) defines the shape of the biconcave lens arranged in the rear lens group. If the upper limit of the condition (1) is exceeded, the refractive power of the object side surface of said biconcave lens is too weak to correct curvature of field sufficiently favorably. If the lower limit of the condition (1) is exceeded, in contrast, said lens is not a biconcave lens, but has the shape of a meniscus lens, thereby shortening the distance $f_c$ as measured from the final surface of the lens system to the image surface. In other words, if said lens has the shape of a meniscus lens, the rear principal point is shifted toward the object side, thereby bringing the final surface close to the image surface and shortening $f_c$ accordingly. Then, the above-described zoom lens system according to the present invention should desirably satisfy the following condition (2):

$$1.15 < \beta_{IIW} < 1.7 \qquad (2)$$

wherein the reference symbol $\beta_{IIW}$ represents imaging magnification of the rear lens group at the wide position.

For a zoom lens system of the same type as the zoom lens system according to the present invention, it is possible to shorten the distance $f_B$ as measured from the image side principal point of the rear lens group to the image surface and shorten the total length thereof accordingly. However, the rear lens group II has a large diameter since the rear lens group II is located close to the film surface on an assumption that the stop is positionally coincident with the front lens group I. In order to prevent the diameter of the rear lens group II from being enlarged, it is sufficient to prolong $f_c$. However, since the image side principal point of the rear lens group II is ordinarily located within the lens system, $f_c$ is smaller than $f_B$, thereby making it necessary to set a larger value of $f_B$ for a target value of $f_c$ contrary to the purpose of shortening the total length. Therefore, it is important for designing a compact zoom lens system to set $f_c$ and $f_B$ with good balance so as to make compatible the two demands of shortening the total length of the lens system and minimizing the diameter of the rear lens group II.

The present invention has succeeded in making compatible an adequate value of the back focal length and shortening of the total length of the lens system by arranging the biconcave lens in the rear lens group II so as to displace the image side principal point of the rear lens group II toward the image side or minimize the difference between $f_c$ and $f_B$.

FIG. 1 allows the inventor to obtain the following formulae:

$$L_W = e_W + f_B = f_I - \frac{(1 - \beta_{IIW})^2}{\beta_{IIW}} \cdot f_{II} \quad \text{(i)}$$

$$f_B = f_{II} \cdot (1 - \beta_{IIW}) \quad \text{(ii)}$$

$$\Delta_1 = f_{II} \cdot (1 - Z) \cdot \left( \beta_{IIW} - \frac{1}{Z \cdot \beta_{IIW}} \right) \quad \text{(iii)}$$

$$\Delta_2 = f_{II} \cdot (1 - Z) \cdot \beta_{IIW} \quad \text{(iv)}$$

wherein the reference symbol z represents the varifocal ratio, the reference symbols $f_I$ and $f_{II}$ designate the focal lengths of the front and rear lens groups respectively, the reference symbol $L_W$ denotes the total length of the lens system at the wide position, the reference symbols $e_W$ represents the distance between the principal points of the front lens group I and rear lens group II, and the reference symbols $\Delta_I$ and $\Delta_{II}$ designate displacements of the front lens group I and rear lens group II respectively from the wide position to the tele position. Since $f_{II}$ has a negative value, $\beta_{IIW}$ must be larger than 1 as judged from the above-mentioned formula (ii) in order to prevent mechanical interference between the lens system and film surface. And, in order to enlarge the value of $f_B$, it is necessary to enlarge the value of $|f_{II}|$ or $\beta_{IIW}$. When $|f_{II}|$ has a larger value, both $\Delta_I$ and $\Delta_{II}$ also have larger values as is judged from the formulae (iii) and (iv), i.e. the displacements of the movable lens groups are prolonged, thereby making it impossible to design the lens system compact.

When $\beta_{IIW}$ has too large a value, on the other hand, it is impossible to correct aberrations favorably with the limited number of the lenses arranged in the zoom lens system.

As is judged from the above descriptions, $\beta_{IIW}$ should desirably satisfy the above-mentioned condition (2).

If $\beta_{IIW}$ is larger than the upper limit of 1.7 of the condition (2), it will be desirable for prolonging the back focal length $f_B$ but will disable to correct aberrations favorably. If $\beta_{IIW}$ is smaller than the lower limit of 1.15 of the condition (2), in contract, it will disable to prolong the back focal length $f_B$.

In addition, an upper limit of 1.45 in the condition (2) will be more desirable. That is to say, it is more desirable for the zoom lens system according to the present invention to satisfy the following condition:

$$1.15 < \beta_{IIW} < 1.45$$

In the zoom lens system according to the present invention, the front lens group I should desirably comprise, in the order from the object side, a positive meniscus lens convex on the object side, a negative lens, a positive lens convex on the image side and a positive lens convex on the image side, and satisfy the following conditions (3) through (6):

$$0.6 < f_I/f_W < 0.87 \quad \text{(3)}$$
$$0.8 < |f_{II}|/f_I < 1.6 \quad \text{(4)}$$

$$-2.4 < \frac{r_4 - r_5}{r_4 + r_5} \quad \text{(5)}$$

$$0.1 < d_5/f_3 < 0.6 \quad \text{(6)}$$

wherein the reference symbols $f_W$ represents the focal length of the lens system as a whole at the wide position, the reference symbol $r_4$ designates the radius of curvature on the image side surface of the negative lens arranged in the front lens group I, the reference symbol $r_5$ denotes the radius of curvature on the object side surface of the positive lens convex on the image side arranged in the front lens group I, the reference symbol $d_5$ designates the thickness of said positive lens and the reference symbol $f_3$ designates the focal length of said positive lens.

In the lens system having the above-described composition, the air lens formed between the positive meniscus lens convex on the object side and the negative lens arranged in the front lens group has a function to minimize aberrations, especially spherical aberration, and the balance between thickness and refractive power of said positive lens having a convex surface on the image side serves to shift the rear principal point of the front lens group I toward the image side so as to reserve the high vari-focal ratio and the airspace between both the lens groups at the tele position.

In the rear lens group II, balance among the refractive powers of the lenses is so selected as to reserve the high vari-focal ratio, and suppress offaxial aberrations and minimize the outside diameter of the negative meniscus lens.

Further, the zoom lens system according to the present invention is so designed as to satisfy the above-mentioned conditions (3) through (6) for the purpose of favorably correcting aberrations over the entire varifocal range.

The conditions (3) and (4) define refractive power distribution in the zoom lens system according to the present invention, and are adopted to make the zoom lens system compact and accomplish a vari-focal ratio of 2 or higher.

If the upper limit of the condition (3) is exceeded, the rear lens group II will contact or intersect with the image surface, thereby making it difficult to reserve the required back focal length and prolonging the total length of the lens system, contrary to the purpose of the present invention. If the lower limit of the condition (3) is exceeded, in contrast, the total length of the zoom lens system will be shortened, but the refractive power of each lens group will be strong, thereby making it difficult to reserve good quality at the peripherical portions of images.

If the upper limit of the condition (4) is exceeded, the lenses arranged in the rear lens group II will have large diameters and it will be difficult to reserve a zoom ratio of about 2 or higher. If the lower limit of the condition (4) is exceeded, positive distortion will be aggravated on the side of the wide position.

The condition (5) is related to the shape of the air lens reserved between the negative lens and positive lens convex on the image side which are arranged in the front lens group I. If the lower limit of the condition (5) is exceeded, high order aberrations of spherical aberration will be remarkably produced in the positive direction. The higher order aberrations of spherical aberration will be produced remarkably on the side of the tele position. It is preferable to define an upper limit of the condition (5) which should be satisfied by the zone lens system according to the present invention:

$$-2.4 < \frac{r_4 - r_5}{r_4 + r_5} < 5$$

When the upper limit of the above-mentioned condition is not exceeded, it is easy for the zoom lens system according to the present invention to correct spherical aberration favorably.

Further, it is more preferable to set the upper limit of the above-mentioned condition at 0.1. In other words, the high order aberrations of spherical aberration will be produced remarkably in the negative direction if the upper limit of 0.1 is exceeded.

It is desirable to define an upper limit of the above-mentioned condition (5) and set the following condition (5') to be satisfied by the zoom lens system according to the present invention:

$$\frac{r_4 - r_5}{r_4 + r_5} < 0.1 \tag{5'}$$

Performance of the zoom lens system according to the present invention is largely dependent on manufacturing accuracy of the negative lens and the positive lens arranged on the image side thereof which are comprised in the front lens group I and to be manufactured at high manufacturing cost. The condition (5') is adopted to minimize the dependency of performance of the zoom lens system on manufacturing accuracy of these lenses, facilitate machining and assembly of the parts of the lens system and realize low manufacturing cost. If the condition (5') is not satisfied, performance of the zoom lens system will be largely dependent on manufacturing accuracy of said negative lens and positive lens, thereby making it difficult to properly machine and assemble the parts of the zoom lens systems.

The condition (6) defines refractive power distribution in the front lens group I and closely related to location of the rear principal point of the front lens group I. If the upper limit of the condition (6) is exceeded, each of the lenses arranged in the front lens group I will have strong refractive power, thereby making it difficult to obtain a flat image surface. If the lower limit of the condition (6) is exceeded, in contrast, the rear principal point of the front lens group I will be shifted toward the object side, thereby making it difficult to reserve the airspace between the front lens group I and the rear lens group II, or the vari-focal ratio of about 2 or higher.

As for refractive power distribution in the rear lens group II, the zoom lens system according to the present invention should desirably satisfy the following condition (7):

$$0.7 < |f_7|/|f_{II}| < 1.4 \tag{7}$$

wherein the reference symbol $f_7$ represents focal length of the negative meniscus lens arranged in the rear lens group II.

If the upper limit of the condition (7) is exceeded, it will be difficult to flatten the meridional image surface over the entire vari-focal range. If the lower limit of the condition (7) is exceeded, positive distortion will be aggravated at the wide position. In addition, it is more desirable to set the upper limit of the condition (7) at 1.2 for the purpose of flattening the image surface.

Moreover, in order to maintain proper balance between chromatic aberrations, the zoom lens system according to the present invention should desirably satisfy the following conditions (8) and (9):

$$\nu_5 > 30 \tag{8}$$
$$\nu_7 > 45 \tag{9}$$

wherein the reference symbol $\nu_5$ represents Abbe's number of said positive lens and the reference symbol $\nu_7$ designates Abbe's number of said negative meniscus lens.

The condition (8) is defined for maintaining favorable lateral chromatic aberration at the wide position. If the lower limit of the condition (8) is exceeded, lateral chromatic aberration for the g-line will be produced remarkably in the negative direction at the wide position.

The condition (9) is necessary to maintain good balance between longitudinal chromatic aberration and lateral chromatic aberration. If the lower limit of the condition (9) is exceeded, longitudinal chromatic aberration for the g-line will be produced remarkably in the positive direction at the wide position and lateral chromatic aberration for the g-line will be aggravated remarkably in the positive direction at the tele position, thereby hindering favorable imaging performance from being accomplished.

In the zoom lens system according to the present invention, the front lens group I having positive refractive power and comprising, in the order from the object side, a positive meniscus lens convex on the object side, a negative lens and a positive lens (or two positive lenses) is based on a fundamental composition of a triplet and designed basically for positive-negative-positive power distribution. In this triplet type in which aberrations are remarkably produced by the negative lens, coma may not be corrected sufficiently in an attempt to correct aberrations with good balance in the lens system as a whole. In such a case, coma is remarkably produced especially at an intermediate image height, resulting in degradation of imaging performance.

In order to prevent coma from being produced, it is preferable to select positive-negative-positive-negative power distribution for the front lens group I as a whole by arranging a negative lens having relatively weak power on the extreme image side in the front lens group I. This power distribution makes it possible to accomplish the object of the present invention, i.e., a combination of a high vari-focal ratio, a short total length and favorably corrected aberration.

When the front lens group I has the composition described above, it is more desirable for the zoom lens system according to the present invention to satisfy the following conditions (10) through (13):

$$0.65 < f_I/f_W < 0.87 \tag{10}$$
$$0.55 < |f_{II}|/f_W < 1.1, \ f_{II} < 0 \tag{11}$$
$$6 < |f_A|/f_W, \ f_A < 0 \tag{12}$$
$$0.65 < |r_A|/f_W < 1.65, \ r_A < 0 \tag{13}$$

wherein the reference symbol $f_A$ represents the focal length of the negative lens arranged on the extreme image side in the front lens group I and the reference symbol $r_A$ designates the radius of curvature on the object side surface of the negative lens arranged on the extreme object side in the front lens group I.

The conditions (10) and (11) define focal length of the front lens group I and the rear lens group II respectively, and are adopted so as to make compact the zoom lens system according to the present invention. When the front lens group I has the positive-negative-positive-negative composition, the focal lengths of the lens group should desirably satisfy the conditions (10) and (11) in place of the aforementioned conditions (3) and (4). If both the lens groups have powers weak enough to allow the upper limits of the conditions (10) and (11) to be exceeded, total length of the zoom lens system will be prolonged contrary to the object of the present invention. If both the lens groups have powers strong enough to allow the lower limits of the conditions (10) and (11) to be exceeded, total length of the lens system will be shortened, but aberrations produced in the lens groups are too excessive to be corrected sufficiently even by the lens composition described above. Further, it will be difficult to reserve the required minimum back focal length, thereby enlarging the diameter of the lenses arranged in the rear lens group II.

The condition (12) defines the focal length of the above-mentioned negative lens, i.e., the negative lens arranged on the extreme image side in the front lens group I. If power of the above-mentioned negative lens is strong enough to allow the lower limit of the condition (12) to be exceeded, Petzval's sum will have a large negative value and can difficultly be corrected with the glass materials currently available.

The condition (13) defines the radius of curvature $|r_A|$ on the object side surface of the negative lens arranged on the extreme image side in the front lens group I. If $|r_A|$ is large enough to allow the upper limit of the condition (13) to be exceeded, the coma correcting effect will be insufficient. If $|r_A|$ is small enough to allow the lower limit of the condition (13) to be exceeded, in contrast, high order aberrations not only of coma but also of other aberrations will be produced excessively and can hardly be corrected favorably by the lens system as a whole.

The negative lens arranged in the foregoing description on the extreme image side in the front lens group I can be relocated between the lenses arranged in the front lens group I. However, such relocation will increase the outside diameter of the front lens group I and be disadvantageous for compact design of the zoom lens system since rays are heightened by the diverging function of the negative lens. Therefore, it is preferable to arrange this negative lens on the extreme image side in the front lens group I.

For the zoom lens system according to the present invention, it is preferable to satisfy the following conditions (2') and (11') in place of the afore-mentioned conditions (2) and (11) respectively:

$$1.2 < \beta_{IIW} < 1.5 \quad (2')$$
$$0.6 < |f_{II}|/f_W < 0.95, \quad f_{II} < 0 \quad (11')$$

Now, significance of the afore-mentioned conditions will be described. If $\beta_{IIW}$ exceeds the upper limit of the condition (2'), the power of the front lens group will be enhanced, thereby making it impossible to correct aberrations sufficiently with the small number of the lenses arranged in the zoom lens system according to the present invention. If $\beta_{IIW}$ is smaller than the lower limit of the condition (2'), in contrast, the total length of the zoom lens system will be prolonged contrary to the object of the present invention as is understood from the formula (iii). If $|f_{II}|$ is longer than the upper limit of the condition (11'), the displacements of the lens groups determined by the formulae (iii) and (iv) are prolonged contrary to the object of the present invention. If $|f_{II}|$ is shorter than the lower limit of the condition (11'), it will be impossible to reserve the required minimum back focal length as is understood from the formula (i) and, in addition, to correct aberrations with the number of the lenses arranged in the rear lens group. Moreover, it is effective for more favorable correction of aberrations in the zoom lens system to use aspherical surface(s).

BRIEF DESCRIPTION OF THE DRAWINGS

FIG. 15 through FIG. 57 show curves illustrating aberration characteristics of the Embodiments

DETAILED DESCRIPTION OF THE PREFERRED EMBODIMENTS

Figure 1:
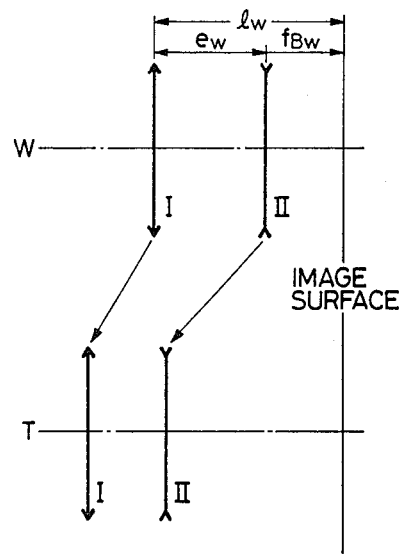
FIG. 1 shows a diagram illustrating the fundamental composition and displacements of the lens groups of the zoom lens system according to the present invention.

Now, the preferred embodiments of the zoom lens system according to the present invention will be described below:

Embodiment 1 f = 39.316–82.383, F/4.648–F/6.205
2ω = 57.57°–29.38°

| | | | |
|---|---|---|---|
| $r_1 = 19.7115$ | | | |
| | $d_1 = 2.1421$ | $n_1 = 1.74400$ | $\nu_1 = 44.73$ |
| $r_2 = 50.0884$ | | | |
| | $d_2 = 1.7709$ | | |
| $r_3 = -26.0969$ | | | |
| | $d_3 = 2.5334$ | $n_2 = 1.80440$ | $\nu_2 = 39.58$ |
| $r_4 = 19.4547$ | | | |
| | $d_4 = 0.7502$ | | |
| $r_5 = 23.8846$ | | | |
| | $d_5 = 8.0990$ | $n_3 = 1.58913$ | $\nu_3 = 60.97$ |
| $r_6 = -25.5622$ | | | |
| | $d_6 = 0.1696$ | | |
| $r_7 = 62.0996$ | | | |
| | $d_7 = 3.0273$ | $n_4 = 1.56873$ | $\nu_4 = 63.16$ |
| $r_8 = -31.3146$ | | | |
| | $d_8 = 0.9702$ | | |
| $r_9 = \infty$ (stop) | | | |
| | $d_9$ (variable) | | |
| $r_{10} = 891.7207$ | | | |
| | $d_{10} = 2.7920$ | $n_5 = 1.53172$ | $\nu_5 = 48.90$ |
| $r_{11} = -21.9960$ | | | |
| | $d_{11} = 0.1947$ | | |
| $r_{12} = -36.4061$ | | | |
| | $d_{12} = 1.3714$ | $n_6 = 1.72916$ | $\nu_6 = 54.68$ |
| $r_{13} = 101.9587$ | | | |
| | $d_{13} = 6.9837$ | | |
| $r_{14} = -14.0846$ | | | |
| | $d_{14} = 2.0000$ | $n_7 = 1.72916$ | $\nu_7 = 54.68$ |
| $r_{15} = -37.4899$ | | | |
| f | 39.316 | 57.968 | 82.383 |
| $d_9$ | 13.8086 | 6.4481 | 1.8500 |
| $f_B$ | 6.993 | 25.428 | 49.560 |

$$\frac{r_a + r_b}{r_a - r_b} = -0.474, \quad \beta_{IIW} = 1.304$$

$$f_I/f_W = 0.767, \quad |f_{II}|/f_I = 0.988$$

$$\frac{r_4 - r_5}{r_4 + r_5} = -0.102, \quad d_5/f_3 = 0.363$$

$$|f_{II}|/f_W = 0.758, \quad |f_7|/|f_{II}| = 1.077$$

Embodiment 1-continued $$f = 39.316-82.383, \quad F/4.648-F/6.205$$
$$2\omega = 57.57°-29.38°$$

| $\nu_5 = 48.90,$ | $\nu_7 = 54.68$ |
|---|---|

Embodiment 2

$$f = 36.228-67.638, \quad F/4.600-F/5.800$$
$$2\omega = 61.61°-35.42°$$

$r_1 = 18.7413$
  $d_1 = 2.8490$    $n_1 = 1.74400$    $\nu_1 = 44.73$
$r_2 = 39.2345$
  $d_2 = 1.6748$
$r_3 = -18.9120$
  $d_3 = 2.4418$    $n_2 = 1.80440$    $\nu_2 = 39.58$
$r_4 = 20.0589$
  $d_4 = 0.3366$
$r_5 = 22.2996$
  $d_5 = 6.1831$    $n_3 = 1.58913$    $\nu_3 = 60.97$
$r_6 = -17.6773$
  $d_6 = 0.2281$
$r_7 = 39.7554$
  $d_7 = 2.5483$    $n_4 = 1.56384$    $\nu_4 = 60.69$
$r_8 = -38.8891$
  $d_8 = 1.0000$
$r_9 = \infty$ (stop)
  $d_9$ (variable)
$r_{10} = 308.7292$
  $d_{10} = 2.8664$    $n_5 = 1.53256$    $\nu_5 = 45.91$
$r_{11} = -20.4908$
  $d_{11} = 0.1516$
$r_{12} = -33.6327$
  $d_{12} = 1.2000$    $n_6 = 1.74100$    $\nu_6 = 52.68$
$r_{13} = 86.2160$
  $d_{13} = 6.3305$
$r_{14} = -12.9571$
  $d_{14} = 1.7500$    $n_7 = 1.72916$    $\nu_7 = 54.68$
$r_{15} = -31.3922$

| f  | 36.228  | 50.004 | 67.638 |
|----|---------|--------|--------|
| $d_9$ | 11.9702 | 5.8803 | 1.7049 |
| $f_B$ | 7.001   | 21.385 | 39.796 |

$$\frac{r_a + r_b}{r_a - r_b} = -0.439, \qquad \beta_{IIW} = 1.309$$

$$f_I/f_W = 0.764, \qquad |f_{II}|/f_I = 1.044$$

$$\frac{r_4 - r_5}{r_4 + r_5} = -0.053, \qquad d_5/f_3 = 0.348$$

$$|f_{II}|/f_W = 0.798, \qquad |f_7|/|f_{II}| = 1.090$$
$$\nu_5 = 45.91, \qquad \nu_7 = 54.68$$

Embodiment 3

$$f = 36.221-67.608, \quad F/4.599-F/5.798$$
$$2\omega = 61.62°-35.44°$$

$r_1 = 18.7139$
  $d_1 = 1.9916$    $n_1 = 1.74400$    $\nu_1 = 44.73$
$r_2 = 54.5100$
  $d_2 = 1.3094$
$r_3 = -19.4194$
  $d_3 = 1.0817$    $n_2 = 1.83400$    $\nu_2 = 37.16$
$r_4 = 39.8516$
  $d_4 = 0.5607$
$r_5 = -475.5982$
  $d_5 = 6.1795$    $n_3 = 1.56873$    $\nu_3 = 63.16$
$r_6 = -17.2283$
  $d_6 = 0.1484$
$r_7 = 41.5222$
  $d_7 = 2.7802$    $n_4 = 1.56873$    $\nu_4 = 63.16$
$r_8 = -32.2436$
  $d_8 = 0.8149$
$r_9 = \infty$ (stop)
  $d_9$ (variable)
$r_{10} = 5630.4118$
  $d_{10} = 2.9239$    $n_5 = 1.53172$    $\nu_5 = 48.90$
$r_{11} = -20.9782$
  $d_{11} = 0.1000$

Embodiment 3-continued $$f = 36.221-67.608, \quad F/4.599-F/5.798$$
$$2\omega = 61.62°-35.44°$$

$r_{12} = -40.2758$
  $d_{12} = 1.2000$    $n_6 = 1.74100$    $\nu_6 = 52.68$
$r_{13} = 87.8432$
  $d_{13} = 5.8882$
$r_{14} = -12.9200$
  $d_{14} = 1.7500$    $n_7 = 1.72916$    $\nu_7 = 54.68$
$r_{15} = -30.1082$

| f  | 36.221  | 49.989 | 67.608 |
|----|---------|--------|--------|
| $d_9$ | 13.9651 | 7.2741 | 2.6866 |
| $f_B$ | 6.999   | 22.197 | 41.647 |

$$\frac{r_a + r_b}{r_a - r_b} = -0.371, \qquad \beta_{IIW} = 1.284$$

$$f_I/f_W = 0.779, \qquad |f_{II}|/f_I = 1.104$$

$$\frac{r_4 - r_5}{r_4 + r_5} = -1.183, \qquad d_5/f_3 = 0.198$$

$$|f_{II}|/f_W = 0.860, \qquad |f_7|/|f_{II}| = 1.041$$
$$\nu_5 = 48.90, \qquad \nu_7 = 54.68$$

Embodiment 4

$$f = 36.224-67.628, \quad F/4.600-F/5.800$$
$$2\omega = 61.61°-35.43°$$

$r_1 = 18.5972$
  $d_1 = 2.5416$    $n_1 = 1.74400$    $\nu_1 = 44.73$
$r_2 = 43.5788$
  $d_2 = 1.5237$
$r_3 = -21.2277$
  $d_3 = 1.6115$    $n_2 = 1.80440$    $\nu_2 = 39.58$
$r_4 = 21.6777$
  $d_4 = 0.8080$
$r_5 = 26.8685$
  $d_5 = 7.0289$    $n_3 = 1.56873$    $\nu_3 = 63.16$
$r_6 = -18.6121$
  $d_6 = 0.1500$
$r_7 = 42.5743$
  $d_7 = 2.6665$    $n_4 = 1.56873$    $\nu_4 = 63.16$
$r_8 = -43.5531$
  $d_8 = 1.4148$
$r_9 = \infty$ (stop)
  $d_9$ (variable)
$r_{10} = -156.6880$
  $d_{10} = 2.5954$    $n_5 = 1.53172$    $\nu_5 = 48.90$
$r_{11} = -20.5544$
  $d_{11} = 0.1900$
$r_{12} = -47.2134$
  $d_{12} = 1.2000$    $n_6 = 1.74100$    $\nu_6 = 52.68$
$r_{13} = 102.9265$
  $d_{13} = 5.3343$
$r_{14} = -12.6006$
  $d_{14} = 1.7500$    $n_7 = 1.72916$    $\nu_7 = 54.68$
$r_{15} = -31.0876$

| f  | 36.224  | 49.998 | 67.628 |
|----|---------|--------|--------|
| $d_9$ | 13.2058 | 6.7786 | 2.3720 |
| $f_B$ | 7.000   | 21.751 | 40.632 |

$$\frac{r_a + r_b}{r_a - r_b} = -0.371, \qquad \beta_{IIW} = 1.290$$

$$f_I/f_W = 0.775, \qquad |f_{II}|/f_I = 1.071$$

$$\frac{r_4 - r_5}{r_4 + r_5} = -0.107, \qquad d_5/f_3 = 0.343$$

$$|f_{II}|/f_W = 0.830, \qquad |f_7|/|f_{II}| = 1.006$$
$$\nu_5 = 48.90, \qquad \nu_7 = 54.68$$

Embodiment 5

$$f = 36-67.9, \quad F/4.5-F/5.6$$
$$2\omega = 61.9°-35.3°$$

$r_1 = 18.2770$

Embodiment 5-continued $f = 36$–$67.9$, F/4.5–F/5.6
$2\omega = 61.9°$–$35.3°$

| | | | |
|---|---|---|---|
| $r_2 = 42.4810$ | $d_1 = 2.6200$ | $n_1 = 1.74400$ | $\nu_1 = 44.73$ |
| $r_3 = -20.0600$ | $d_2 = 1.6000$ | | |
| $r_4 = 19.4820$ | $d_3 = 1.5700$ | $n_2 = 1.80440$ | $\nu_2 = 39.58$ |
| $r_5 = 25.9080$ | $d_4 = 0.8400$ | | |
| $r_6 = -18.8800$ | $d_5 = 6.3700$ | $n_3 = 1.56873$ | $\nu_3 = 63.16$ |
| $r_7 = 41.8770$ | $d_6 = 0.1500$ | | |
| $r_8 = -26.1470$ | $d_7 = 2.7500$ | $n_4 = 1.56873$ | $\nu_4 = 63.16$ |
| $r_9 = -41.0230$ | $d_8 = 0.5000$ | | |
| $r_{10} = -54.2390$ | $d_9 = 1.5000$ | $n_5 = 1.49216$ | $\nu_5 = 57.50$ |
| $r_{11} = \infty$ (stop) | $d_{10} = 1.5000$ | | |
| $r_{12} = 273.8780$ | $d_{11}$ (variable) | | |
| $r_{13} = -16.9770$ | $d_{12} = 3.8800$ | $n_6 = 1.53172$ | $\nu_6 = 48.90$ |
| $r_{14} = -26.3600$ | $d_{13} = 0.1900$ | | |
| $r_{15} = 87.7290$ | $d_{14} = 1.2000$ | $n_7 = 1.74100$ | $\nu_7 = 52.68$ |
| $r_{16} = -11.2360$ | $d_{15} = 4.9000$ | | |
| $r_{17} = -27.6790$ | $d_{16} = 1.7500$ | $n_8 = 1.72916$ | $\nu_8 = 54.68$ |

| f | 36 | 50 | 67.9 |
|---|---|---|---|
| $d_{11}$ | 10.623 | 5.391 | 1.845 |

$\dfrac{r_a + r_b}{r_a - r_b} = -0.538$, $\quad \beta_{IIW} = 1.347$ $f_I/f_W = 0.742$, $\quad |f_{II}|/f_I = 0.942$ $\dfrac{r_4 - r_5}{r_4 + r_5} = -0.142$, $\quad d_5/f_3 = 0.315$ $|f_7|/|f_{II}| = 1.077$, $\quad \nu_5 = 48.9$
$\nu_7 = 54.68$, $\quad |f_{II}|/f_W = 0.699$
$|f_A|/f_W = 9.873$, $\quad |r_A|/f_W = 1.140$

Embodiment 6

$f = 36$–$67.9$  F/4.5–F/5.6
$2\omega = 61.9°$–$35.3°$

| | | | |
|---|---|---|---|
| $r_1 = 18.4180$ | $d_1 = 2.6200$ | $n_1 = 1.74400$ | $\nu_1 = 44.73$ |
| $r_2 = 47.4130$ | $d_2 = 1.6000$ | | |
| $r_3 = -20.7590$ | $d_3 = 1.5700$ | $n_2 = 1.80440$ | $\nu_2 = 39.58$ |
| $r_4 = 19.2640$ | $d_4 = 0.8400$ | | |
| $r_5 = 27.3190$ | $d_5 = 6.2900$ | $n_3 = 1.56873$ | $\nu_3 = 63.16$ |
| $r_6 = -20.4020$ | $d_6 = 0.1500$ | | |
| $r_7 = 43.5890$ | $d_7 = 2.7500$ | $n_4 = 1.56873$ | $\nu_4 = 63.16$ |
| $r_8 = -23.7480$ | $d_8 = 0.5000$ | | |
| $r_9 = -50.1030$ | $d_9 = 1.6300$ | $n_5 = 1.71300$ | $\nu_5 = 53.84$ |
| $r_{10} = -63.0100$ | $d_{10} = 1.5000$ | | |
| $r_{11} = \infty$ (stop) | $d_{11}$ (variable) | | |
| $r_{12} = 325.3900$ | $d_{12} = 3.8800$ | $n_6 = 1.53172$ | $\nu_6 = 48.90$ |
| $r_{13} = -16.8790$ | $d_{13} = 0.1900$ | | |
| $r_{14} = -26.7170$ | | | |

Embodiment 6-continued $f = 36$–$67.9$  F/4.5–F/5.6
$2\omega = 61.9°$–$35.3°$

| | | | |
|---|---|---|---|
| $r_{15} = 87.1990$ | $d_{14} = 1.2000$ | $n_7 = 1.74100$ | $\nu_7 = 52.68$ |
| $r_{16} = -11.1750$ | $d_{15} = 4.6800$ | | |
| $r_{17} = -26.8610$ | $d_{16} = 1.7500$ | $n_8 = 1.72916$ | $\nu_8 = 54.68$ |

| f | 36 | 50 | 67.9 |
|---|---|---|---|
| $d_{11}$ | 10.827 | 5.474 | 1.845 |

$\dfrac{r_a + r_b}{r_a - r_b} = -0.531$, $\quad \beta_{IIW} = 1.341$ $f_I/f_W = 0.746$, $\quad |f_{II}|/f_I = 0.955$ $\dfrac{r_4 - r_5}{r_4 + r_5} = -0.173$, $\quad d_5/f_3 = 0.292$ $|f_7|/|f_{II}| = 1.072$, $\quad \nu_5 = 48.9$
$\nu_7 = 54.68$, $\quad |f_{II}|/f_W = 0.712$
$|f_A|/f_W = 10.057$, $\quad |r_A|/f_W = 1.392$

Embodiment 7

$f = 35$–$70$ mm, F/4.5–F/5.6
$2\omega = 63.4° \geq 34.3°$

| | | | |
|---|---|---|---|
| $r_1 = 20.2480$ | $d_1 = 2.5000$ | $n_1 = 1.72825$ | $\nu_1 = 28.46$ |
| $r_2 = 32.1940$ | $d_2 = 2.2000$ | | |
| $r_3 = -16.2100$ | $d_3 = 1.2000$ | $n_2 = 1.80518$ | $\nu_2 = 25.43$ |
| $r_4 = -213.7960$ | $d_4 = 1.5600$ | | |
| $r_5 = -36.5130$ | $d_5 = 2.6900$ | $n_3 = 1.59270$ | $\nu_3 = 35.29$ |
| $r_6 = -20.8160$ | $d_6 = 0.1500$ | | |
| $r_7 = 31.3960$ | $d_7 = 3.3100$ | $n_4 = 1.56873$ | $\nu_4 = 63.16$ |
| $r_8 = -19.4630$ | (aspherical surface) | | |
| | $d_8 = 1.5000$ | | |
| $r_9 = \infty$ (stop) | $d_9$ (variable) | | |
| $r_{10} = 1585.0570$ | $d_{10} = 3.9400$ | $n_5 = 1.54814$ | $\nu_5 = 45.78$ |
| $r_{11} = -19.1480$ | $d_{11} = 0.1500$ | | |
| $r_{12} = -29.6810$ | $d_{12} = 1.1800$ | $n_6 = 1.72000$ | $\nu_6 = 50.25$ |
| $r_{13} = 99.7790$ | $d_{13} = 5.9500$ | | |
| $r_{14} = -12.7430$ | $d_{14} = 1.7500$ | $n_7 = 1.72916$ | $\nu_7 = 54.68$ |
| $r_{15} = -29.8840$ | | | |

(aspherical coefficient)
$K_8 = -2.8287$ $\quad A_8 = 0$
$B_8 = -0.10425 \times 10^{-4}$ $\quad C_8 = 0.98086 \times 10^{-7}$
$D_8 = 0.12854 \times 10^{-8}$ $\quad E_8 = -0.19498 \times 10^{-10}$

| f | 35 | 50 | 70 |
|---|---|---|---|
| $d_9$ | 12.607 | 5.612 | 0.949 |

$\dfrac{r_a + r_b}{r_a - r_b} = -0.541$, $\quad \beta_{IIW} = 1.267$ $f_I/f_W = 0.789$, $\quad |f_{II}|/f_I = 1.069$ $\dfrac{r_4 - r_5}{r_4 + r_5} = 0.708$, $\quad d_5/f_3 = 0.035$
$\quad |f_7|/|f_{II}| = 1.078$ $\nu_5 = 45.78$, $\quad \nu_7 = 54.68$,
$\quad |f_{II}|/f_W = 0.844$

Embodiment 8

$$f = 35\text{-}70 \text{ mm, F/4.5-F/5.6}$$
$$2\omega = 63.4°\text{-}34.3°$$

| | | | |
|---|---|---|---|
| $r_1 = 18.7160$ | | | |
| | $d_1 = 2.4600$ | $n_1 = 1.69895$ | $\nu_1 = 30.12$ |
| $r_2 = 29.3820$ | | | |
| | $d_2 = 2.2000$ | | |
| $r_3 = -17.8060$ | | | |
| | $d_3 = 1.2000$ | $n_2 = 1.80518$ | $\nu_2 = 25.43$ |
| $r_4 = 403.8140$ | | | |
| | $d_4 = 1.6600$ | | |
| $r_5 = -159.3950$ | | | |
| | $d_5 = 3.3100$ | $n_3 = 1.56732$ | $\nu_3 = 42.83$ |
| $r_6 = -30.4880$ | | | |
| | $d_6 = 0.1500$ | | |
| $r_7 = 28.7740$ | | | |
| | $d_7 = 3.3400$ | $n_4 = 1.57099$ | $\nu_4 = 50.80$ |
| $r_8 = -19.8640$ (aspherical surface) | | | |
| | $d_8 = 1.5000$ | | |
| $r_9 = \infty$(stop) | | | |
| | $d_9$ (variable) | | |
| $r_{10} = -82.5370$ | | | |
| | $d_{10} = 3.9000$ | $n_5 = 1.53172$ | $\nu_5 = 48.90$ |
| $r_{11} = -20.1680$ | | | |
| | $d_{11} = 0.1500$ | | |
| $r_{12} = -58.1770$ | | | |
| | $d_{12} = 1.2000$ | $n_6 = 1.74400$ | $\nu_6 = 44.73$ |
| $r_{13} = 93.2610$ | | | |
| | $d_{13} = 5.7700$ | | |
| $r_{14} = -11.7770$ (aspherical surface) | | | |
| | $d_{14} = 1.7500$ | $n_7 = 1.72916$ | $\nu_7 = 54.68$ |
| $r_{15} = -29.0560$ (aspherical coefficient) | | | |

$K_8 = -2.8307$       $A_8 = 0$
$B_8 = -0.10512 \times 10^{-5}$       $C_8 = 0.87547 \times 10^{-7}$
$D_8 = 0.76884 \times 10^{-9}$       $E_8 = -0.12464 \times 10^{-10}$
$K_{14} = 0.0075$       $A_{14} = 0$
$B_{14} = 0.11148 \times 10^{-4}$       $C_{14} = 0.57883 \times 10^{-7}$
$D_{14} = -0.13852 \times 10^{-8}$       $E_{14} = 0.16894 \times 10^{-10}$

| f | 35 | 50 | 70 |
|---|---|---|---|
| $d_9$ | 10.776 | 4.563 | 0.421 |

$$\frac{r_a + r_b}{r_a - r_b} = -0.232, \beta_{IIW} = 1.330,$$

$f_I/f_W = 0.752, |f_{II}|/f_I = 1.047$ $$\frac{r_4 - r_5}{r_4 + r_5} = 2.304, d_5/f_3 = 0.050 \ |f_7|/|f_{II}| = 1.030$$

$\nu_5 = 48.90, \nu_7 = 54.68, |f_{II}|/f_W = 0.787$

Embodiment 9

$$f = 35\text{-}70 \text{ mm F/4.5 -F/5.6}$$
$$2\omega = 63.4°\text{-}34.3°$$

| | | | |
|---|---|---|---|
| $r_1 = 22.7730$ | | | |
| | $d_1 = 2.9500$ | $n_1 = 1.71700$ | $\nu_1 = 47.94$ |
| $r_2 = 65.4410$ | | | |
| | $d_2 = 1.4600$ | | |
| $r_3 = -21.1600$ | | | |
| | $d_3 = 1.6000$ | $n_2 = 1.83400$ | $\nu_2 = 37.16$ |
| $r_4 = 51.1340$ | | | |
| | $d_4 = 2.7200$ | | |
| $r_5 = 27.7010$ | | | |
| | $d_5 = 4.6500$ | $n_3 = 1.51633$ | $\nu_3 = 64.15$ |
| $r_6 = -28.1220$ | | | |
| | $d_6 = 0.1500$ | | |
| $r_7 = 62.0380$ | | | |
| | $d_7 = 2.6600$ | $n_4 = 1.51633$ | $\nu_4 = 64.15$ |
| $r_8 = -25.1700$ (aspherical surface) | | | |
| | $d_8 = 1.4800$ | | |
| $r_9 = \infty$(stop) | | | |
| | $d_9$ (variable) | | |
| $r_{10} = 180.0060$ | | | |
| | $d_{10} = 2.8500$ | $n_5 = 1.51742$ | $\nu_5 = 52.41$ |
| $r_{11} = -19.4000$ | | | |
| | $d_{11} = 0.1500$ | | |
| $r_{12} = -38.1170$ | | | |
| | $d_{12} = 1.1900$ | $n_6 = 1.72916$ | $\nu_6 = 54.68$ |
| $r_{13} = 68.5430$ | | | |
| | $d_{13} = 5.0500$ | | |
| $r_{14} = -12.0840$ | | | |
| | $d_{14} = 1.7500$ | $n_7 = 1.72916$ | $\nu_7 = 54.68$ |
| $r_{15} = -35.7260$ (aspherical coefficient) | | | |

$K_8 = -0.0085$       $A_8 = 0$
$B_8 = 0.36829 \times 10^{-4}$       $C_8 = 0.92590 \times 10^{-7}$
$D_8 = 0.14435 \times 10^{-8}$       $E_8 = -0.15887 \times 10^{-10}$

| f | 35 | 50 | 70 |
|---|---|---|---|
| $d_9$ | 11.545 | 5.518 | 1.501 |

$$\frac{r_a + r_b}{r_a - r_b} = -0.285, \beta_{IIW} = 1.309,$$

$f_I/f_W = 0.764, |f_{II}|/f_I = 0.984$ $$\frac{r_4 - r_5}{r_4 + r_5} = 0.297, d_5/f_3 = 0.167,$$

$|f_7|/|f_{II}| = 0.983, \nu_5 = 52.41, \nu_7 = 54.68$
$|f_{II}|/f_W = 0.751$

Embodiment 10

$$f = 35\text{-}70 \text{ mm F/4.5-F/5.6}$$
$$2\omega = 63.4°\text{-}34.3°$$

| | | | |
|---|---|---|---|
| $r_1 = 22.1260$ | | | |
| | $d_1 = 3.0100$ | $n_1 = 1.74950$ | $\nu_1 = 35.27$ |
| $r_2 = 32.0030$ | | | |
| | $d_2 = 2.0000$ | | |
| $r_3 = -22.0560$ | | | |
| | $d_3 = 1.6100$ | $n_2 = 1.84666$ | $\nu_2 = 23.88$ |
| $r_4 = -67.6810$ | | | |
| | $d_4 = 6.8100$ | | |
| $r_5 = 20.1590$ | | | |
| | $d_5 = 3.0100$ | $n_3 = 1.51602$ | $\nu_3 = 56.80$ |
| $r_6 = -21.4280$ (aspherical surface) | | | |
| | $d_6 = 1.4800$ | | |
| $r_7 = \infty$(stop) | | | |
| | $d_7$ (variable) | | |
| $r_8 = -128.1820$ | | | |
| | $d_8 = 2.8400$ | $n_4 = 1.51454$ | $\nu_4 = 54.69$ |
| $r_9 = -17.6090$ | | | |
| | $d_9 = 0.1500$ | | |
| $r_{10} = -37.4950$ | | | |
| | $d_{10} = 1.2000$ | $n_5 = 1.74400$ | $\nu_5 = 44.73$ |
| $r_{11} = 199.8580$ | | | |
| | $d_{11} = 5.0300$ | | |
| $r_{12} = -11.4740$ | | | |
| | $d_{12} = 1.7500$ | $n_6 = 1.72916$ | $\nu_6 = 54.68$ |
| $r_{13} = -37.3310$ (aspherical coefficient) | | | |

$K_6 = -0.0121$       $A_6 = 0$
$B_6 = 0.59295 \times 10^{-4}$       $C_6 = 0.48873 \times 10^{-7}$
$D_6 = 0.17090 \times 10^{-8}$       $E_6 = -0.17692 \times 10^{-10}$

| f | 35 | 50 | 70 |
|---|---|---|---|
| $d_7$ | 10.705 | 5.182 | 1.500 |

$$\frac{r_a + r_b}{r_a - r_b} = -0.684, \beta_{IIW} = 1.337$$

$f_I/f_W = 0.748, |f_{II}|/f_I = 0.941$ $$\frac{r_4 - r_5}{r_4 + r_5} = 1.848, d_5/f_3 = 0.146 \ |f_7|/|f_{II}| = 0.950,$$

-continued

Embodiment 10
$\nu_5 = 54.69$, $\nu_7 = 54.68$, $|f_{II}|/f_W = 0.703$

Embodiment 11
$f = 36-67.9$  F/4.5-F/5.6
$2\omega = 61.9\ -35.3°$

| | | | |
|---|---|---|---|
| $r_1 = 17.3600$ | | | |
| | $d_1 = 2.5900$ | $n_1 = 1.72000$ | $\nu_1 = 50.25$ |
| $r_2 = 53.1770$ | | | |
| | $d_2 = 2.0000$ | | |
| $r_3 = -22.5150$ | | | |
| | $d_3' = 1.5700$ | $n_2 = 1.80440$ | $\nu_2 = 39.58$ |
| $r_4 = 19.4250$ | | | |
| | $d_4 = 1.3000$ | | |
| $r_5 = 27.3780$ | | | |
| | $d_5 = 6.2900$ | $n_3 = 1.51633$ | $\nu_3 = 64.15$ |
| $r_6 = -17.0610$ | | | |
| | $d_6 = 0.1500$ | | |
| $r_7 = 35.1840$ | | | |
| | $d_7 = 2.6000$ | $n_4 = 1.51633$ | $\nu_4 = 64.15$ |
| $r_8 = -39.4950$ | | | |
| | $d_8 = 0.5000$ | | |
| $r_9 = \infty$ (stop) | | | |
| | $d_9$ (variable) | | |
| $r_{10} = \infty$ | | | |
| | $d_{10} = 4.000$ | $n_5 = 1.53172$ | $\nu_5 = 48.90$ |
| $r_{11} = -19.2630$ (aspherical surface) | | | |
| | $d_{11} = 0.2000$ | | |
| $r_{12} = -34.0990$ | | | |
| | $d_{12} = 1.2000$ | $n_6 = 1.74100$ | $\nu_6 = 52.68$ |
| $r_{13} = 5.3600$ | | | |
| | $d_{13} = 5.3600$ | | |
| $r_{14} = -11.3010$ | | | |
| | $d_{14} = 1.7500$ | $n_7 = 1.72916$ | $\nu_7 = 54.68$ |
| $r_{15} = -28.5520$ (aspherical coefficient) | | | |

$K_{11} = 0$, $A_{11} = 0$, $B_{11} = -0.10868 \times 10^{-4}$
$C_{11} = 0.90033 \times 10^{-7}$, $D_{11} = -0.25448 \times 10^{-8}$
$E_{11} = 0.13614 \times 10^{-10}$

| f | 36 | 50 | 67.9 |
|---|---|---|---|
| $d_9$ | 11.069 | 5.677 | 2.021 |

$\dfrac{r_a + r_b}{r_a - r_b} = -0.479$, $\beta_{IIW} = 1.338$ $f_I/f_W = 0.748$, $|f_{II}|/f_I = 0.957$ $\dfrac{r_4 - r_5}{r_4 + r_5} = -0.170$, $d_5/f_3 = 0.295$ $|f_7|/|f_{II}| = 1.038$, $\nu_5 = 48.90$
$\nu_7 = 54.68$, $|f_{II}|/f_W = 0.716$

Embodiment 12
$f = 35-70$,  F/4.5-F/5.6
$2\omega = 63.4°-34.3°$

| | | | |
|---|---|---|---|
| $r_1 = 18.3700$ | | | |
| | $d_1 = 2.6200$ | $n_1 = 1.74400$ | $\nu_1 = 44.73$ |
| $r_2 = 39.1770$ | | | |
| | $d_2 = 1.4600$ | | |
| $r_3 = -19.5250$ | | | |
| | $d_3 = 1.5700$ | $n_2 = 1.80440$ | $\nu_2 = 39.58$ |
| $r_4 = 20.9770$ | | | |
| | $d_4 = 0.8400$ | | |
| $r_5 = 26.8100$ | | | |
| | $d_5 = 6.8500$ | $n_3 = 1.56873$ | $\nu_3 = 63.16$ |
| $r_6 = -18.4610$ | | | |
| | $d_6 = 0.1500$ | | |
| $r_7 = 38.3410$ | | | |
| | $d_7 = 2.7500$ | $n_4 = 1.56873$ | $\nu_4 = 63.16$ |
| $r_8 = -34.5650$ | | | |
| | $d_8 = 1.4800$ | | |
| $r_9 = \infty$ (stop) | | | |
| | $d_9$ (variable) | | |
| $r_{10} = 401.9800$ | | | |
| | $d_{10} = 2.8800$ | $n_5 = 1.53172$ | $\nu_5 = 48.90$ |
| $r_{11} = -20.8530$ | | | |
| | $d_{11} = 0.1900$ | | |
| $r_{12} = -43.1550$ | | | |
| | $d_{12} = 1.2000$ | $n_6 = 1.74100$ | $\nu_6 = 52.68$ |
| $r_{13} = 67.9470$ | | | |
| | $d_{13} = 5.3900$ | | |
| $r_{14} = -12.0060$ | | | |
| | $d_{14} = 1.7500$ | $n_7 = 1.72916$ | $\nu_7 = 54.68$ |
| $r_{15} = -32.0030$ | | | |

| f | 35 | 50 | 70 |
|---|---|---|---|
| $d_9$ | 12.260 | 6.129 | 2.042 |

$\dfrac{r_a + r_b}{r_a - r_b} = -0.223$, $\beta_{IIW} = 1.314$, $f_I/f_W = 0.761$, $|f_{II}|/f_I = 1.008$ $\dfrac{r_4 - r_5}{r_4 + r_5} = -0.122$, $d_5/f_3 = 0.337$ $|f_7|/|f_{II}| = 1.017$, $\nu_5 = 48.90$, $\nu_7 = 54.68$
$|f_{II}|/f_W = 0.767$

Embodiment 13
$f = 36-67.9$  F/4.5-F/5.6
$2\omega = 61.9°-35.3°$d

| | | | |
|---|---|---|---|
| $r_1 = 19.9130$ | | | |
| | $d_1 = 2.4200$ | $n_1 = 1.67270$ | $\nu_1 = 32.10$ |
| $r_2 = 33.3040$ | | | |
| | $d_2 = 2.2000$ | | |
| $r_3 = -17.6080$ | | | |
| | $d_3 = 1.2000$ | $n_2 = 1.80518$ | $\nu_2 = 25.43$ |
| $r_4 = -1401.8060$ | | | |
| | $d_4 = 1.5500$ | | |
| $r_5 = 86.3110$ | | | |
| | $d_5 = 3.2700$ | $n_3 = 1.57309$ | $\nu_3 = 42.57$ |
| $r_6 = -45.3280$ | | | |
| | $d_6 = 0.1500$ | | |
| $r_7 = 41.0680$ | | | |
| | $d_7 = 3.2900$ | $n_4 = 1.57135$ | $\nu_4 = 52.92$ |
| $r_8 = -18.8370$ (aspherical surface) | | | |
| | $d_8 = 0.5000$ | | |
| $r_9 = \infty$, (stop) | | | |
| | $d_9$ (variable) | | |
| $r_{10} = \infty$ | | | |
| | $d_{10} = 3.8600$ | $n_5 = 1.57135$ | $\nu_5 = 52.92$ |
| $r_{11} = -27.7880$ (aspherical surface) | | | |
| | $d_{11} = 0.1500$ | | |
| $r_{12} = -71.0580$ | | | |
| | $d_{12} = 1.2000$ | $n_6 = 1.74100$ | $\nu_6 = 52.68$ |
| $r_{13} = 57.0390$ | | | |
| | $d_{13} = 5.8000$ | | |
| $r_{14} = -10.2180$ | | | |
| | $d_{14} = 1.7500$ | $n_7 = 1.73400$ | $\nu_7 = 51.49$ |
| $r_{15} = -21.1430$ (aspherical coefficient) | | | |

$K_8 = 0$, $A_8 = 0$, $B_8 = 0.49318 \times 10^{-4}$
$C_8 = -0.32483 \times 10^{-8}$, $D_8 = 0.65242 \times 10^{-9}$
$E_8 = 0$
$K_{11} = 0$, $A_{11} = 0$, $B_{11} = -0.38670 \times 10^{-4}$
$C_{11} = 0.13024 \times 10^{-7}$, $D_{11} = -0.22976 \times 10^{-8}$
$E_{11} = 0$

| f | 36 | 50 | 67.9 |
|---|---|---|---|
| $d_9$ | 11.641 | 6.066 | 2.288 |

$\dfrac{r_a + r_b}{r_a - r_b} = 0.109$, $\beta_{IIW} = 1.343$ $f_I/f_W = 0.744$   $|f_{II}|/f_I = 0.998$ -continued

Embodiment 13
f = 36−67.9  F/4.5−F/5.6
2ω = 61.9°−35.3°d $\dfrac{r_4 - r_5}{r_4 + r_5} = 1.131$, $d_5/f_3 = 0.063$ $|f_7|/|f_{II}| = 1.078$, $\nu_5 = 52.92$
$\nu_7 = 51.49$  $|f_{II}|/f_W = 0.743$

Embodiment 14
f = 36−67.9  F/4.5−F/5.6
2ω = 61.9°−35.3°

| | | | |
|---|---|---|---|
| $r_1 = 20.5040$ | | | |
| | $d_1 = 2.0000$ | $n_1 = 1.74400$ | $\nu_1 = 44.73$ |
| $r_2 = 34.6630$ | | | |
| | $d_2 = 2.5000$ | | |
| $r_3 = -18.0650$ | | | |
| | $d_3 = 1.8000$ | $n_2 = 1.72825$ | $\nu_2 = 28.46$ |
| $r_4 = \infty$ | | | |
| | $d_4 = 1.6000$ | | |
| $r_5 = 6442.8160$ | | | |
| | $d_5 = 3.3700$ | $n_3 = 1.59551$ | $\nu_3 = 39.21$ |
| $r_6 = -37.9020$ | | | |
| | $d_6 = 0.1600$ | | |
| $r_7 = 37.2660$ | | | |
| | $d_7 = 3.5000$ | $n_4 = 1.55963$ | $\nu_4 = 61.17$ |
| $r_8 = -20.1050$ (aspherical surface) | | | |
| | $d_8 = 0.5300$ | | |
| $r_9 = \infty$ (stop) | | | |
| | $d_9$ (variable) | | |
| $r_{10} = 774.0530$ | | | |
| | $d_{10} = 4.1200$ | $n_5 = 1.51454$ | $\nu_5 = 54.69$ |
| $r_{11} = -16.8990$ | | | |
| | $d_{11} = 0.3400$ (aspherical surface) | | |
| $r_{12} = -23.2880$ | | | |
| | $d_{12} = 2.1800$ | $n_6 = 1.72916$ | $\nu_6 = 54.68$ |
| $r_{13} = 128.6210$ | | | |
| | $d_{13} = 5.0000$ | | |
| $r_{14} = -11.4300$ | | | |
| | $d_{14} = 1.8600$ | $n_7 = 1.72916$ | $\nu_7 = 54.68$ |
| $r_{15} = -25.6690$ (aspherical coefficient) | | | |

$K_8 = 0$, $A_8 = 0$, $B_8 = 0.40296 \times 10^{-4}$
$C_8 = 0.53877 \times 10^{-7}$, $D_8 = 0.10126 \times 10^{-8}$
$E_8 = 0$
$K_{11} = 0$, $A_{11} = 0$, $B_{11} = -0.13518 \times 10^{-4}$
$C_{11} = 0.88531 \times 10^{-7}$, $D_{11} = -0.18306 \times 10^{-8}$
$E_{11} = 0$

| f | 36 | 50 | 67.9 |
|---|---|---|---|
| $d_9$ | 10.778 | 5.548 | 2.003 |

$\dfrac{r_a + r_b}{r_a - r_b} = -0.693$, $\beta_{IIW} = 1.365$ $f_I/f_W = 0.733$, $|f_{II}|/f_I = 0.966$ $\dfrac{r_4 - r_5}{r_4 + r_5} = 1.000$, $d_5/f_3 = 0.053$ $|f_7|/|f_{II}| = 1.171$, $\nu_5 = 54.69$  $\nu_7 = 54.68$
$|f_{II}|/f_W = 0.708$ wherein the reference symbols $r_1$, $r_2$, . . . represent radii of curvature on the surfaces of the respective lenses, the reference symbols $d_1$, $d_2$, . . . designate thicknesses of the respective lenses and airspaces reserved therebetween, the reference symbols $n_1$, $n_2$, . . . denote refractive indices of the respective lenses, and the reference symbols $\nu_1$, $\nu_2$, . . . represent Abbe's numbers of the respective lenses.

Figure 2:
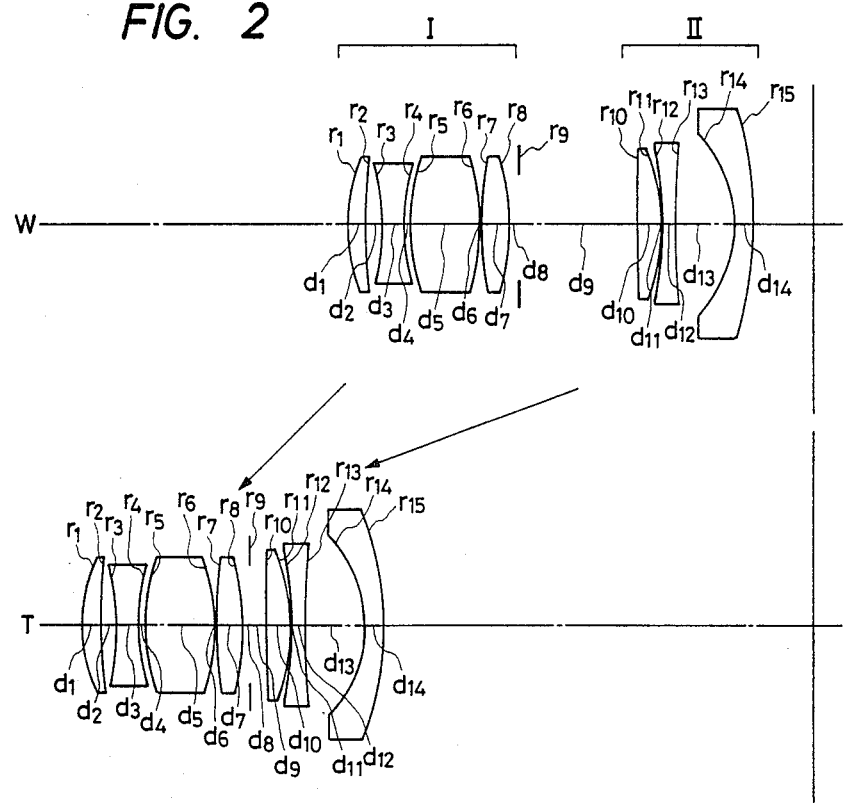
FIG. 2 through FIG. 15 show sectional views illustrating compositions of Embodiments 1 through 14 of the present invention.
Figure 3:
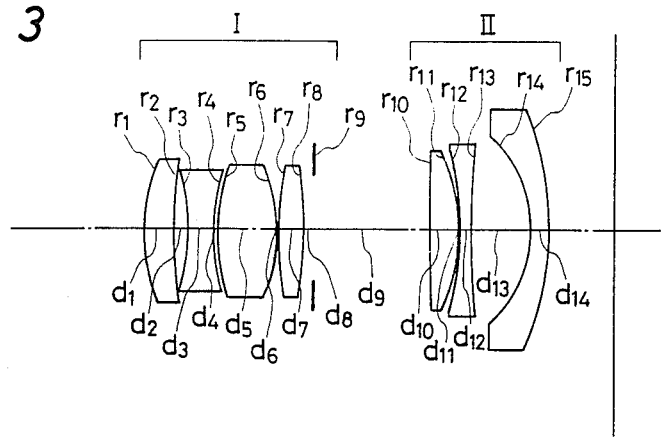
Figure 4:
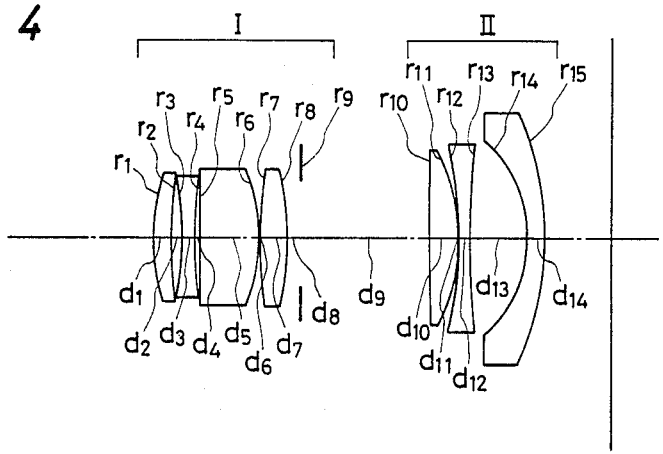
Figure 5:
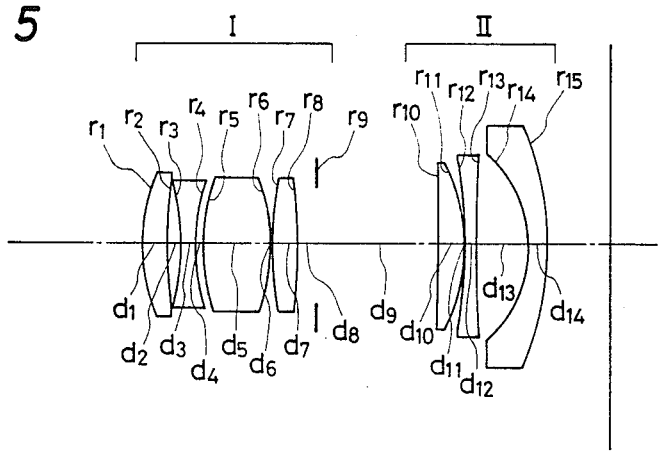
Figure 16:
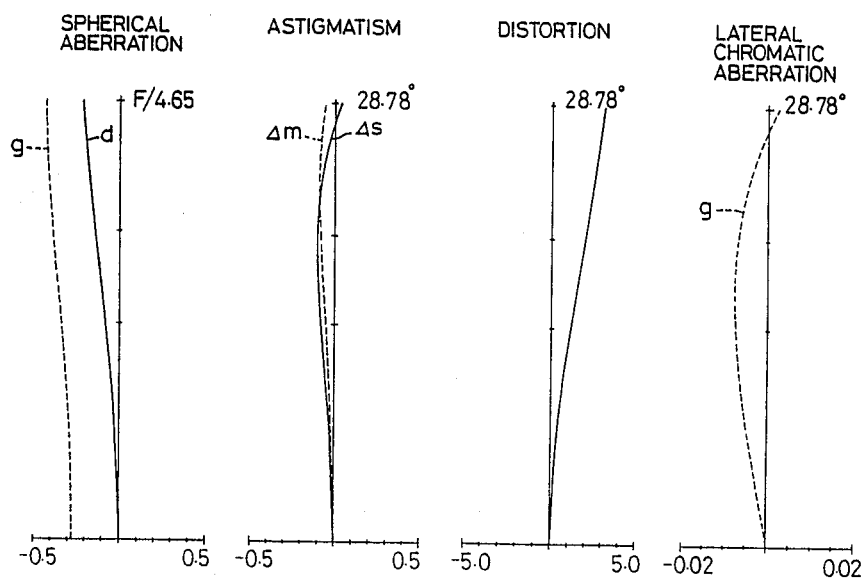
Figure 17:
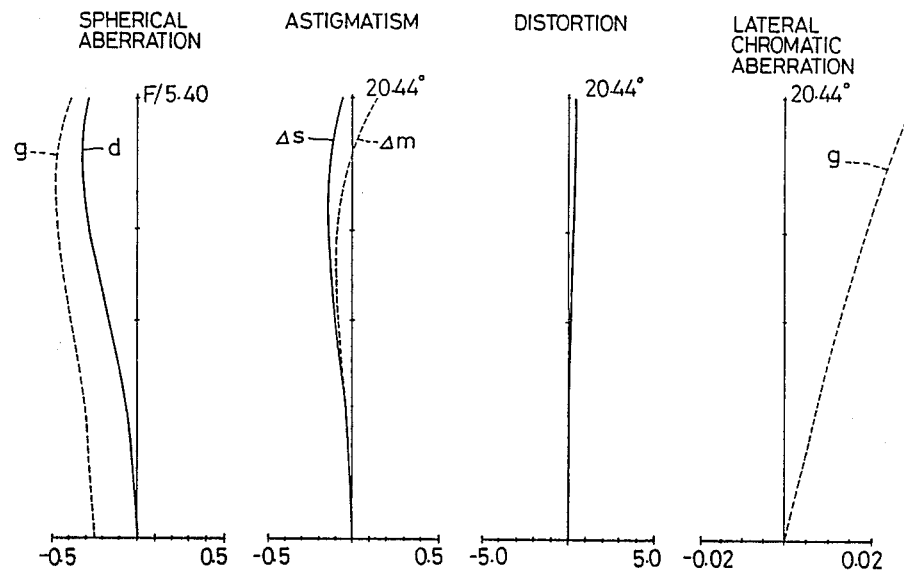
Figure 18:
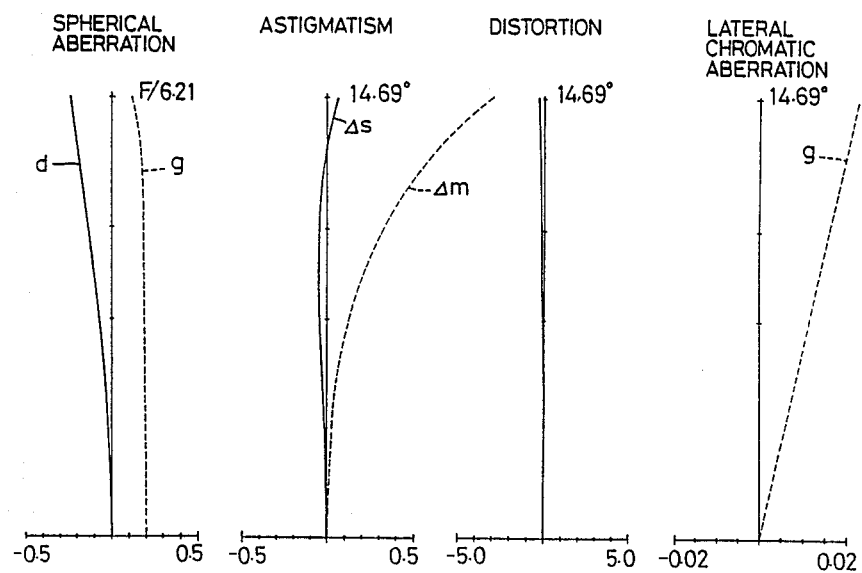
Figure 19:
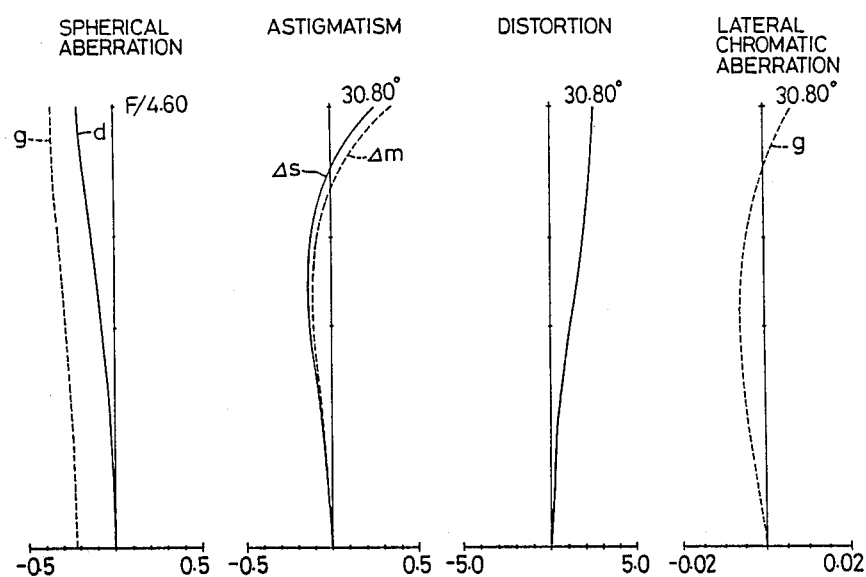
Figure 20:
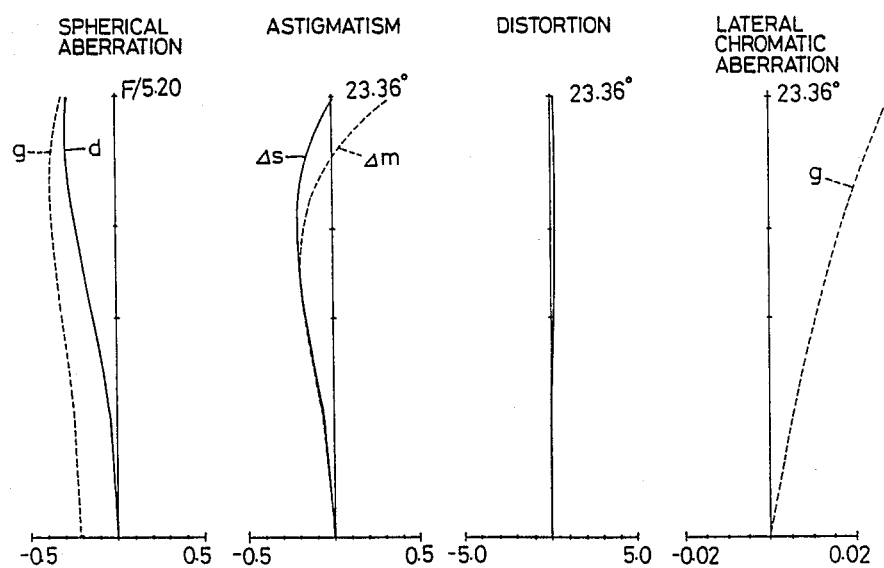
Figure 21:
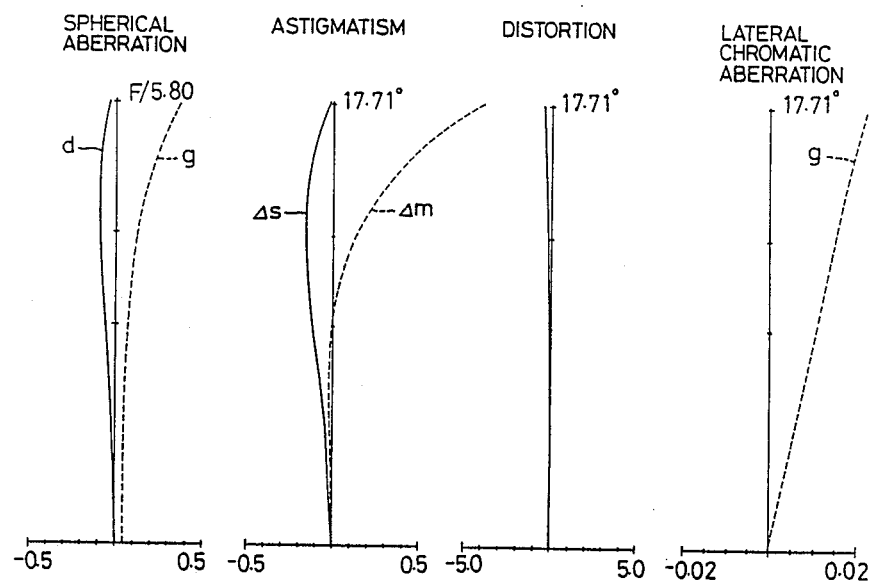
Figure 22:
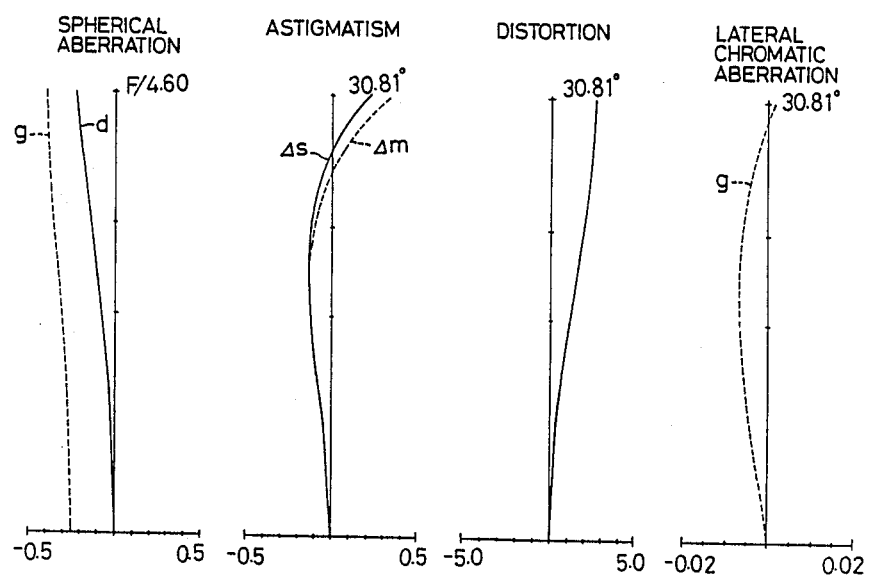
Figure 23:
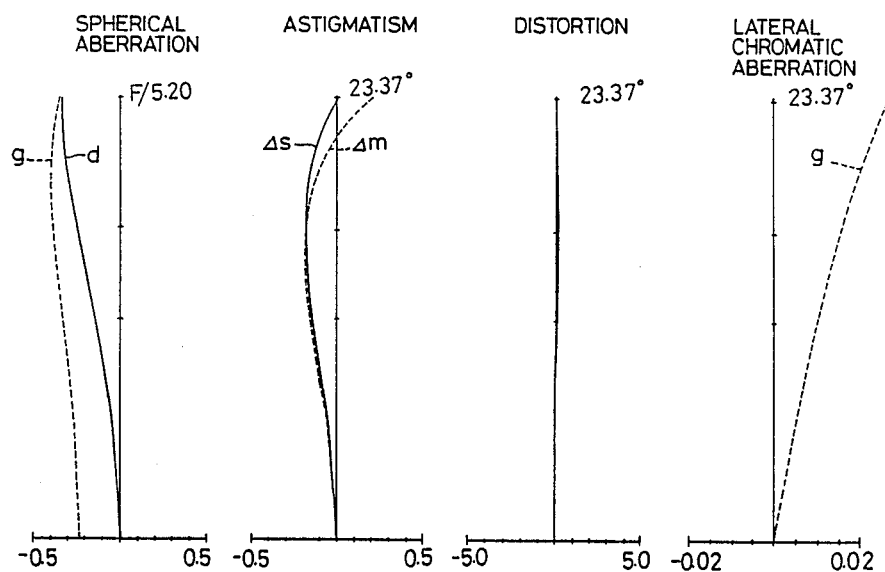
Figure 24:
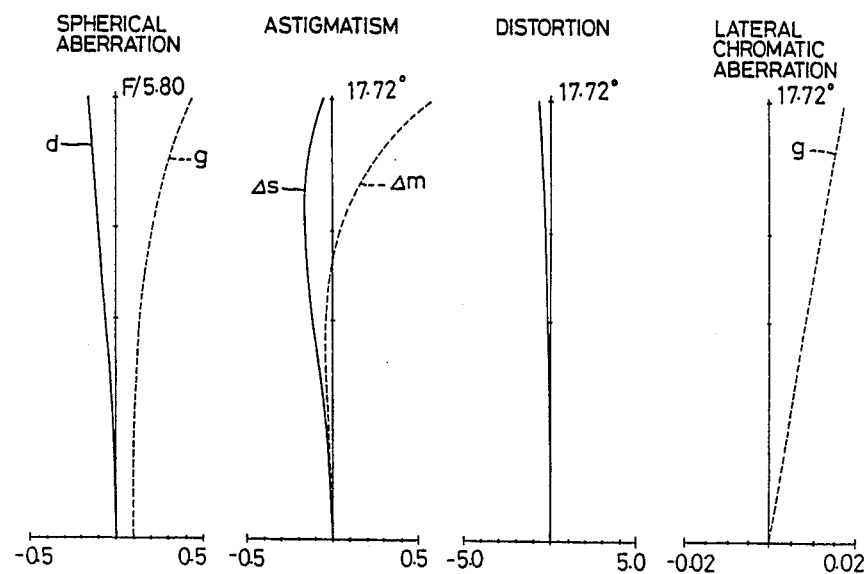
Figure 25:
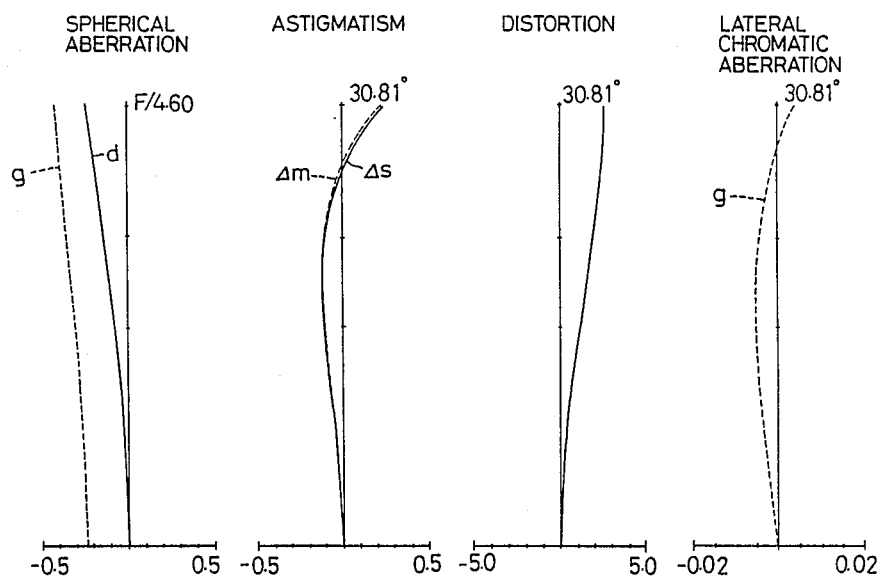
Figure 26:
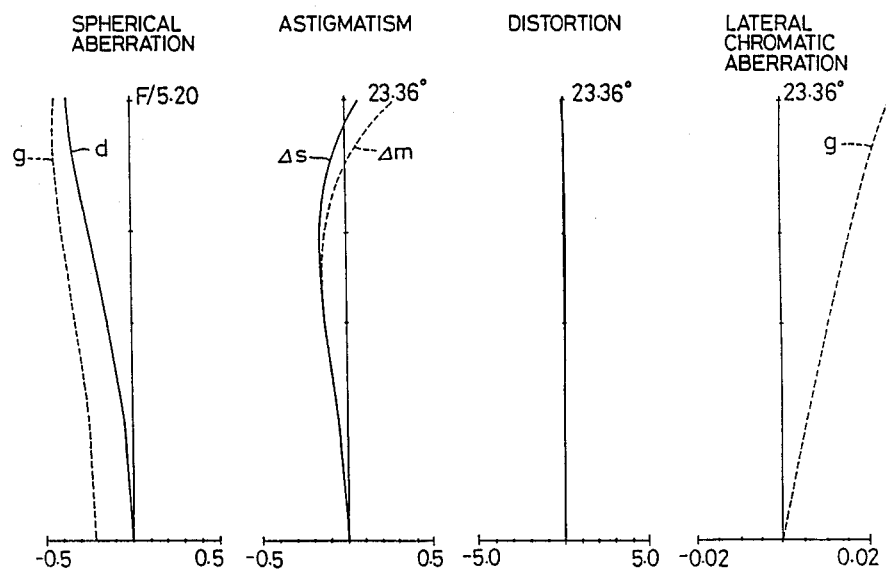
Figure 27:
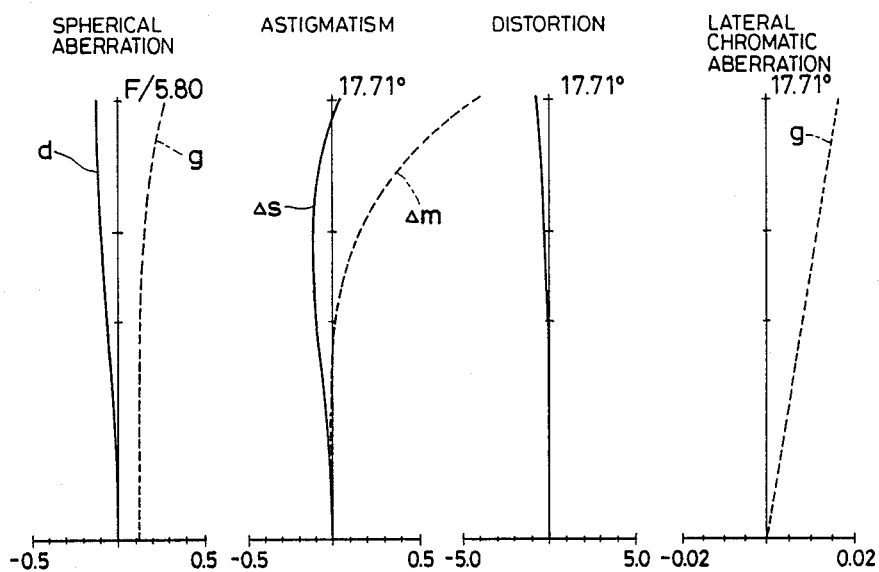

Out of the embodiments described above, the Embodiment 1 has the composition illustrated in FIG. 2, and the aberration characteristics at the wide position, medium focal length and tele position shown in FIG. 16, FIG. 17 and FIG. 18 respectively. The Embodiment 2 has the composition illustrated in FIG. 3, and the aberration characteristics at the wide position, medium focal length and tele position shown in FIG. 19, FIG. 20 and FIG. 21 respectively. The Embodiment 3 has the composition illustrated in FIG. 4, and the aberration characteristics at the wide position, medium focal length and tele position shown in FIG. 22, FIG. 23 and FIG. 24 respectively. The Embodiment 4 has the composition illustrated in FIG. 5, and the aberration characteristics at the wide position, medium focal length and tele position shown in FIG. 25, FIG. 26 and FIG. 27 respectively.

Figure 6:
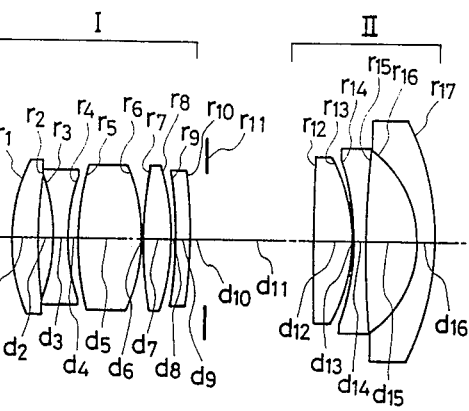
Figure 28:
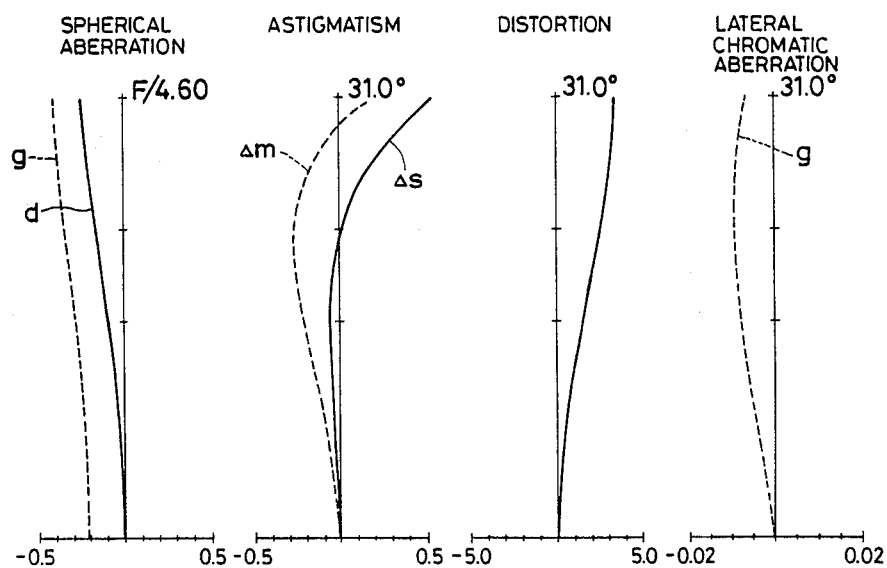
Figure 29:
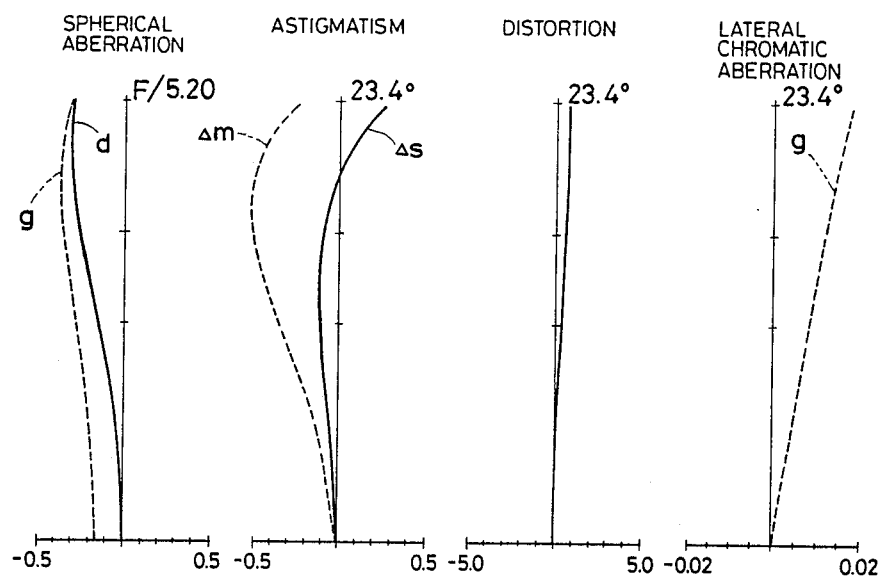
Figure 30:
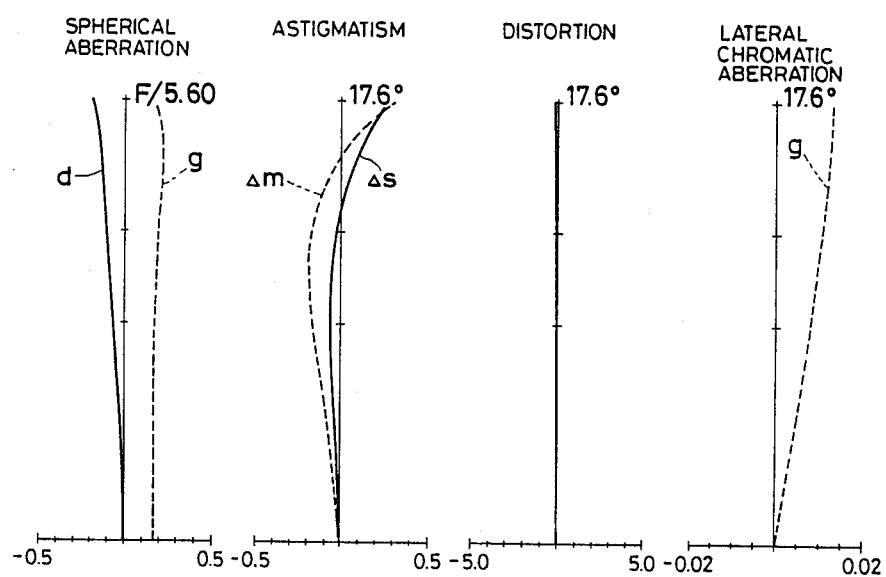

The Embodiment 5 has the composition illustrated in FIG. 6 and the aberration characteristic shown in FIG. 28, FIG. 29 and FIG. 30 respectively.

Figure 7:
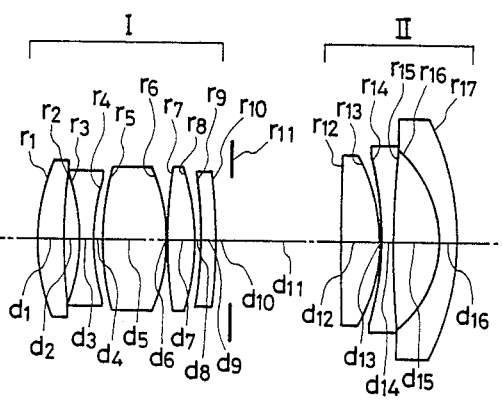
Figure 8:
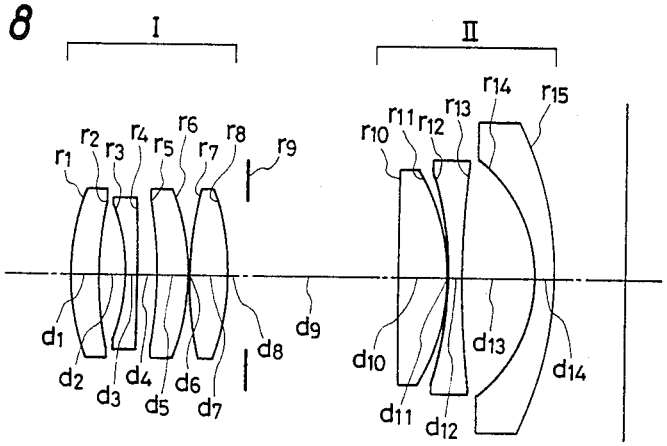
Figure 31:
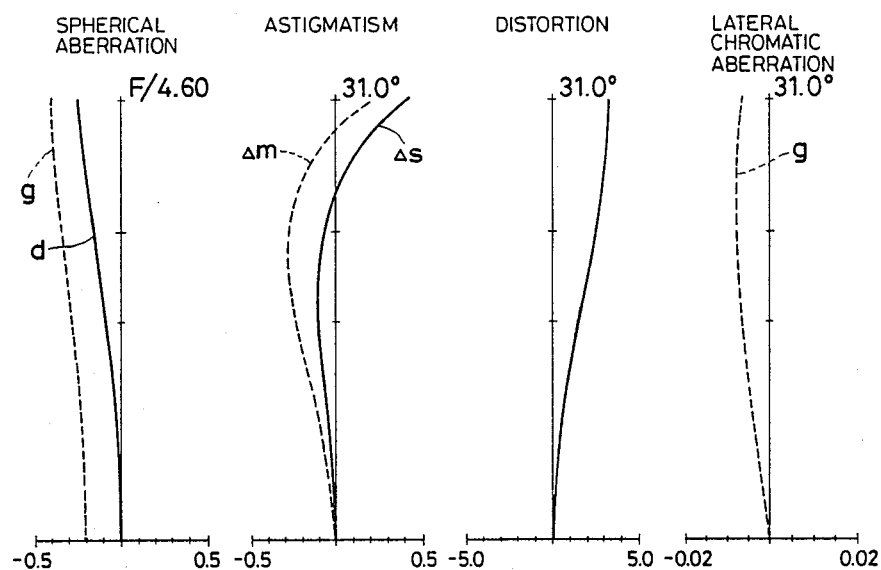
Figure 32:
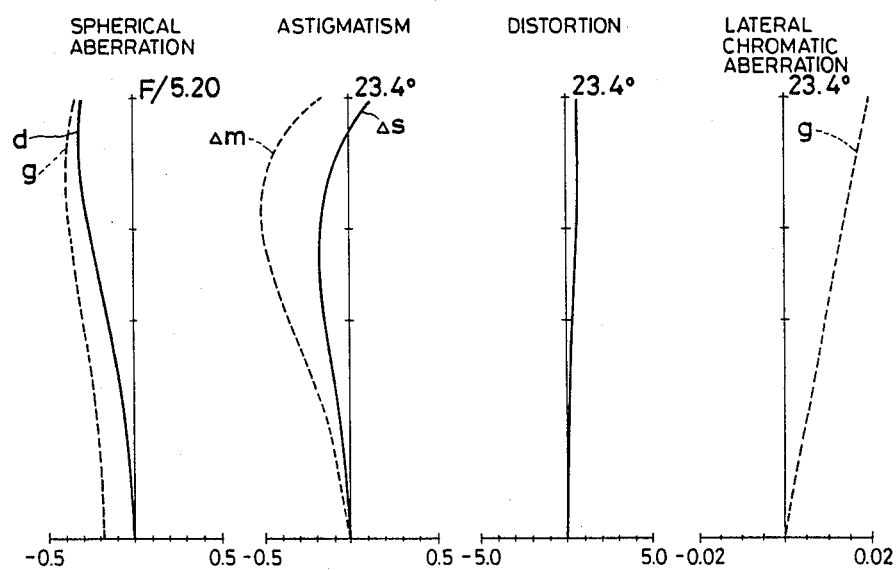
Figure 33:
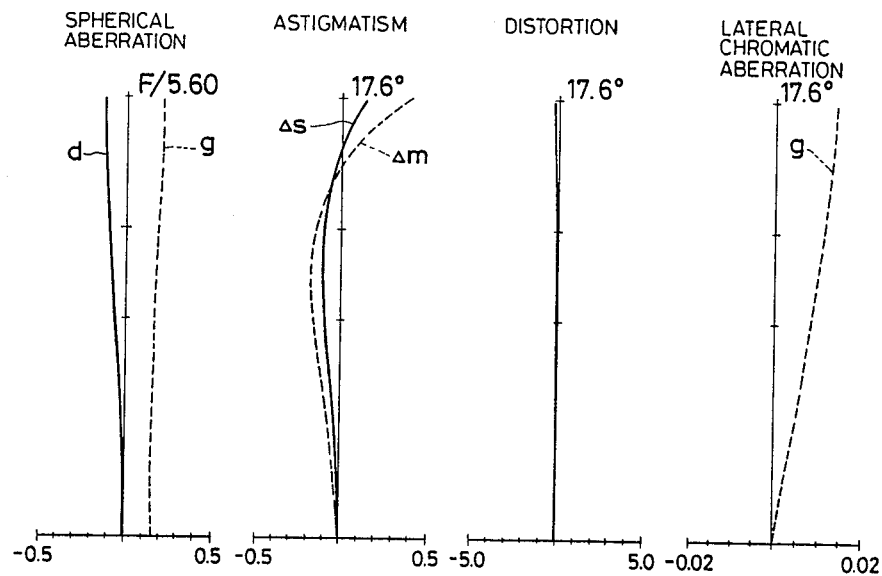
Figure 34:
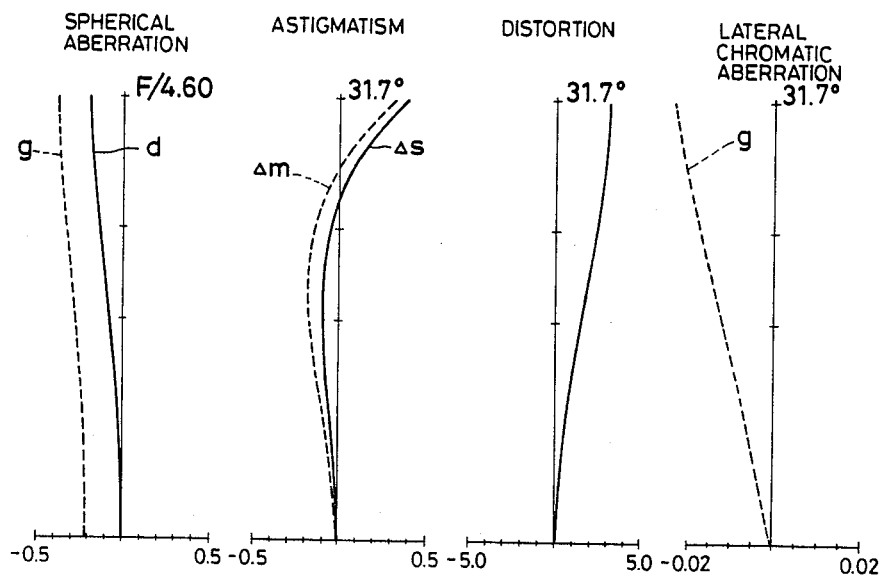
Figure 35:
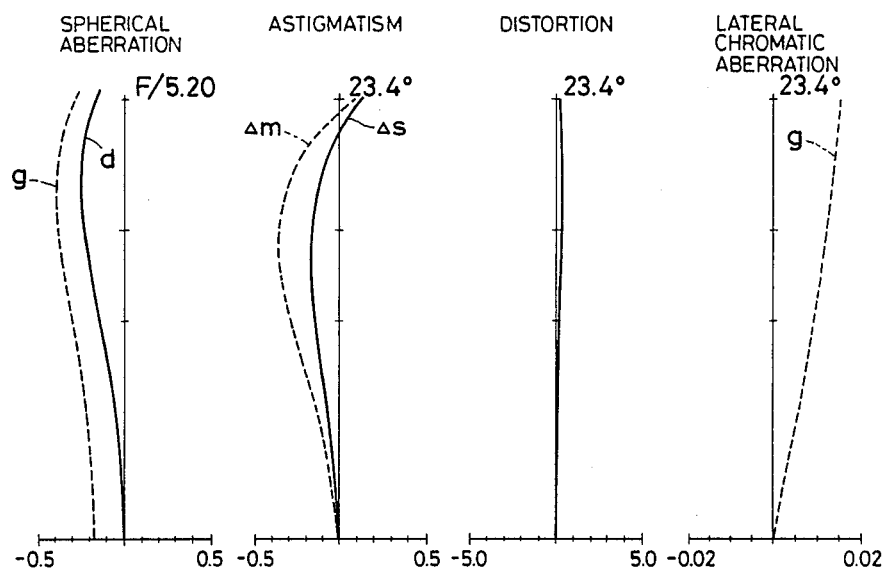
Figure 36:
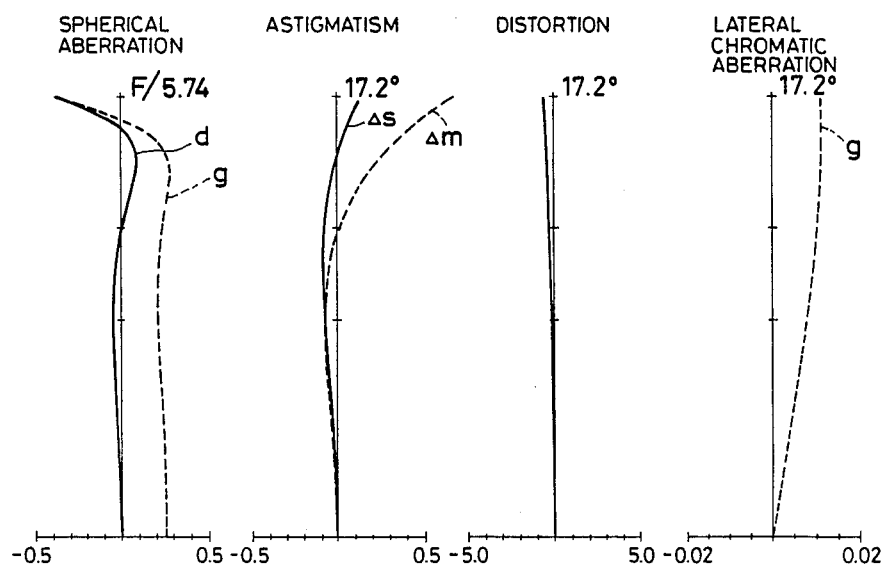

The Embodiment 6 has the composition illustrated in FIG. 7 and the aberration characteristics shown in FIG. 31, FIG. 32 and FIG. 33. The Embodiment 7 has the composition illustrated in FIG. 8 wherein the eighth surface ($r_8$) is designed as an aspherical surface. The aberration characteristics of the Embodiment 7 at the wide position, intermediate focal length and tele position are shown in FIG. 34, FIG. 35 and FIG. 36 respectively.

Figure 9:
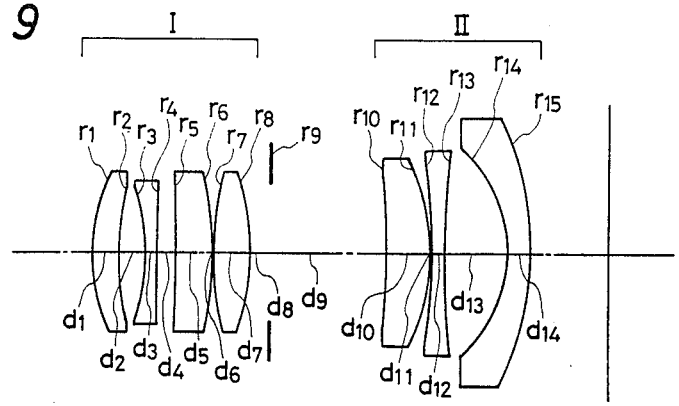
Figure 10:
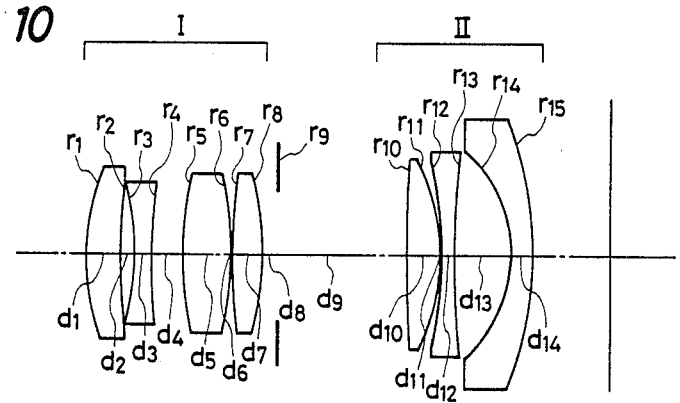
Figure 37:
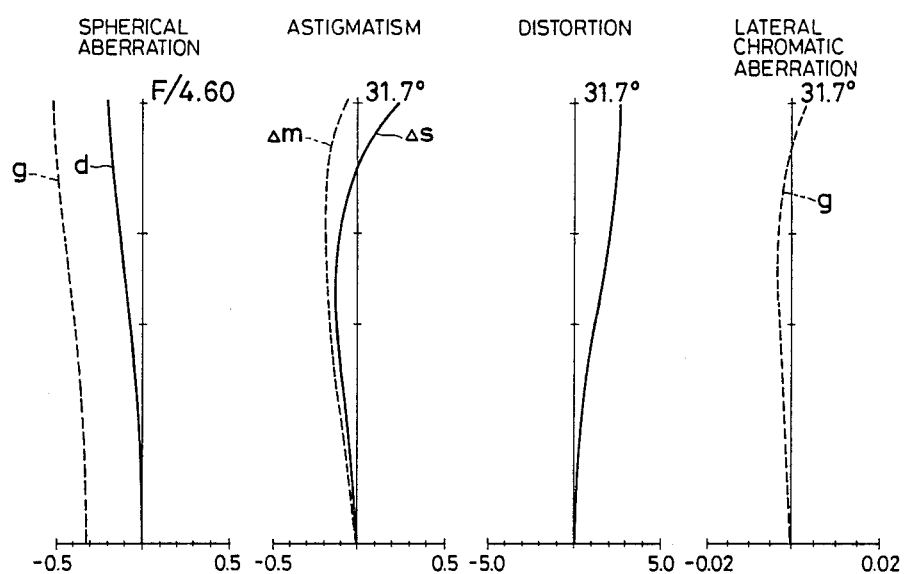
Figure 38:
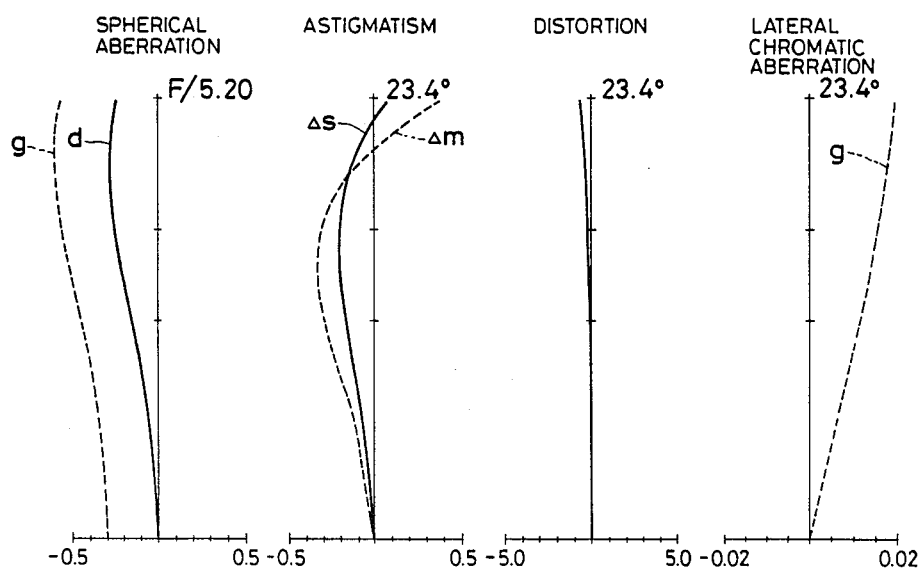
Figure 39:
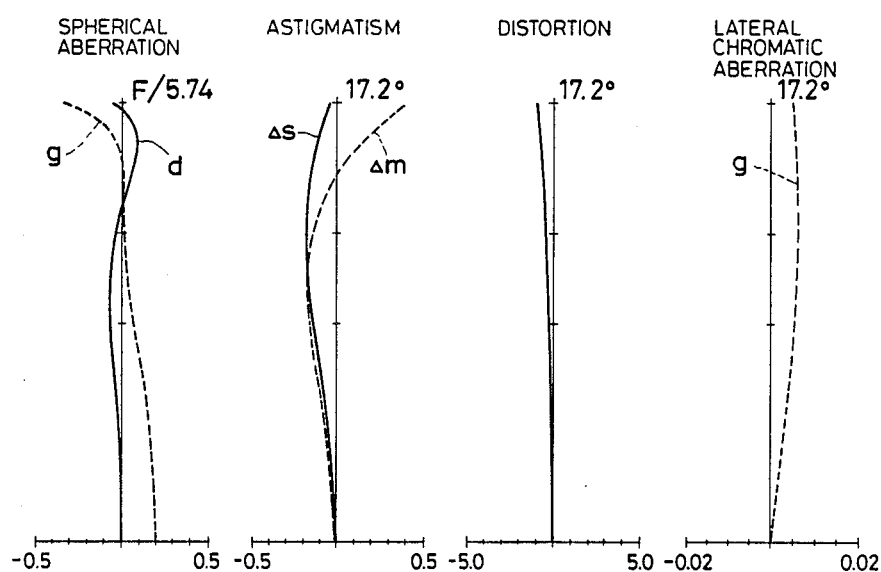
Figure 40:
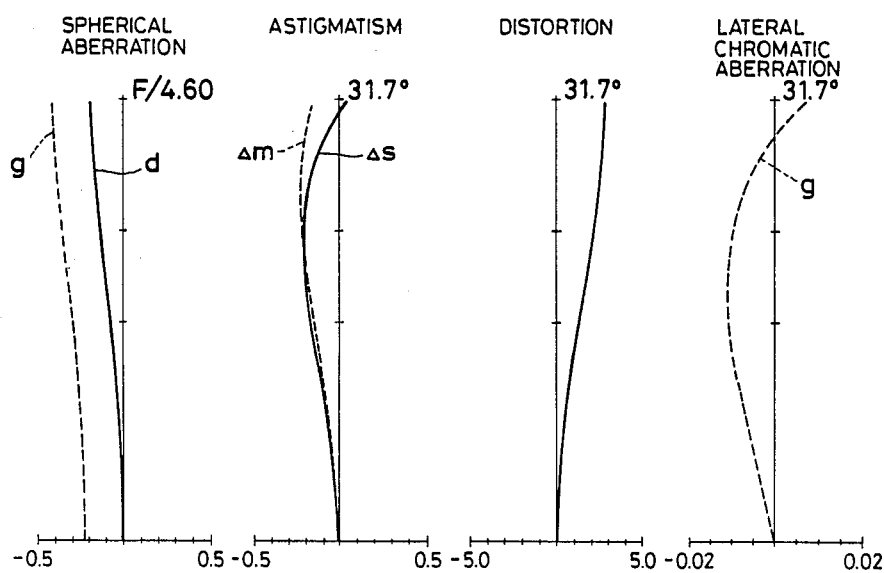
Figure 41:
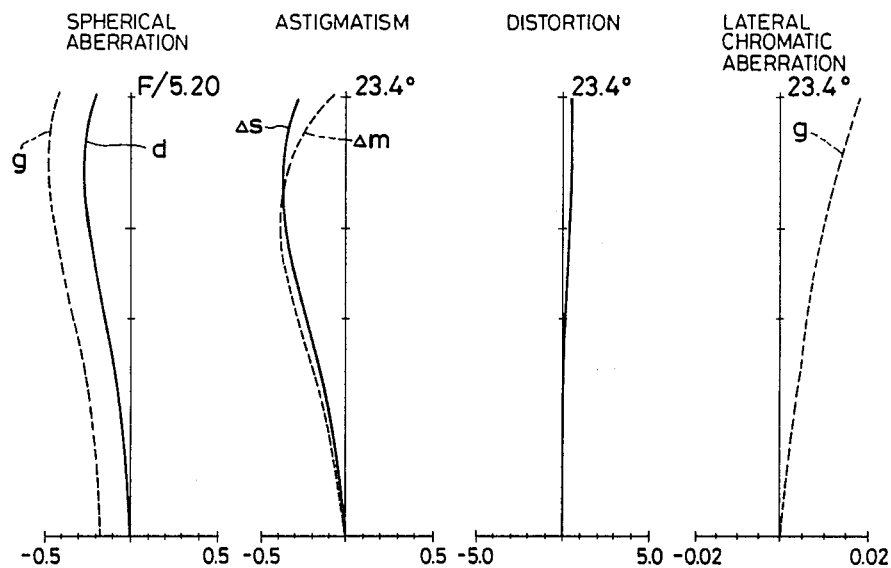
Figure 42:
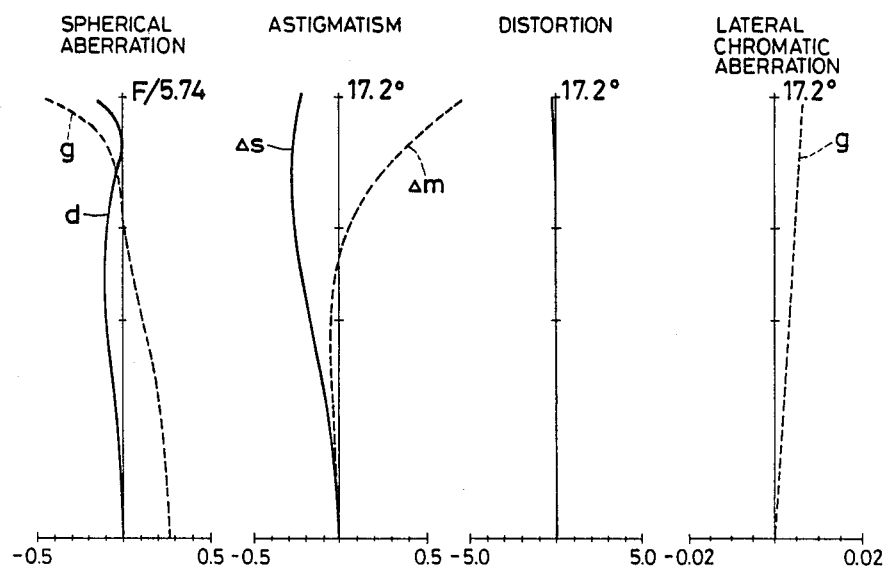

The Embodiment 8 has the composition illustrated in FIG. 9 wherein the eighth surface ($r_8$) is designed as an aspherical surface. The aberration characteristics at the wide position, intermediate focal length and tele position of this embodiment are shown in FIG. 37, FIG. 38 and FIG. 39 respectively. The Embodiment 9 has the composition illustrated in FIG. 10 wherein the eighteh surface ($r_8$) is designed as an aspherical surface. The aberration characteristics of this embodiment at the wide position, intermediate focal length and tele position are shown in FIG. 40, FIG. 41 and FIG. 42 respectively.

Figure 11:
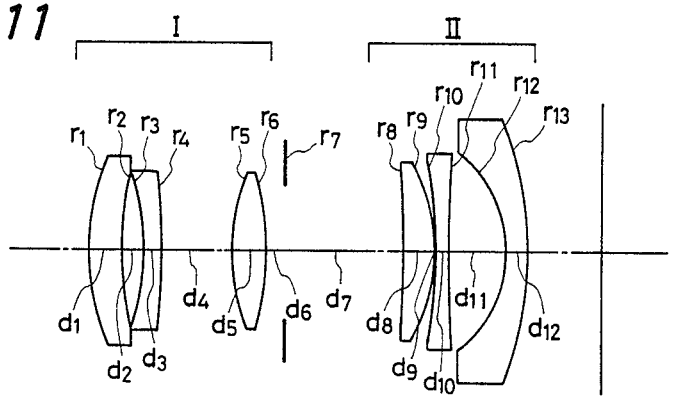
Figure 43:
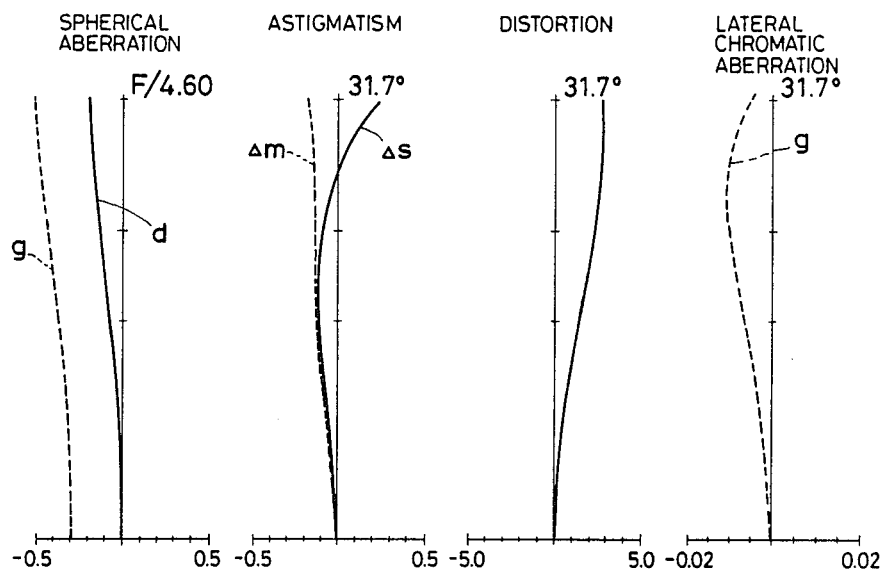
Figure 44:
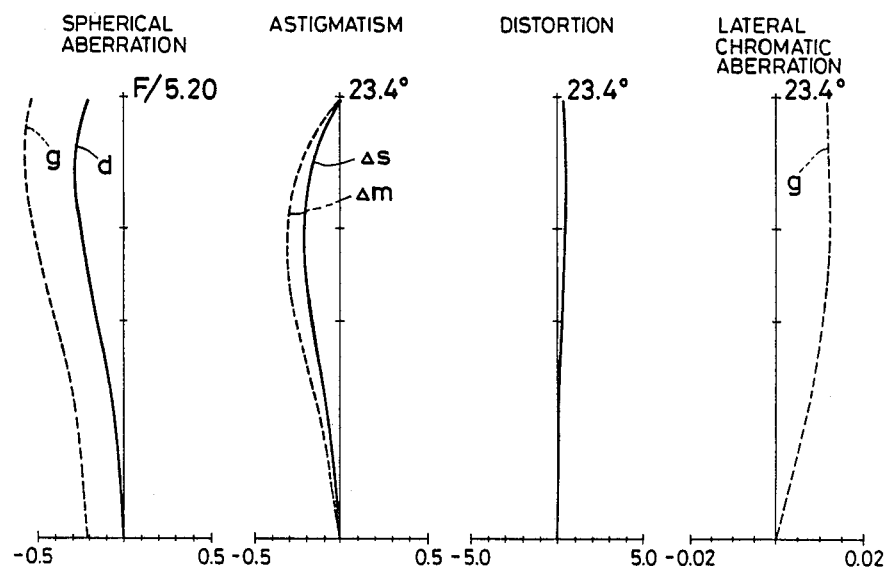
Figure 45:
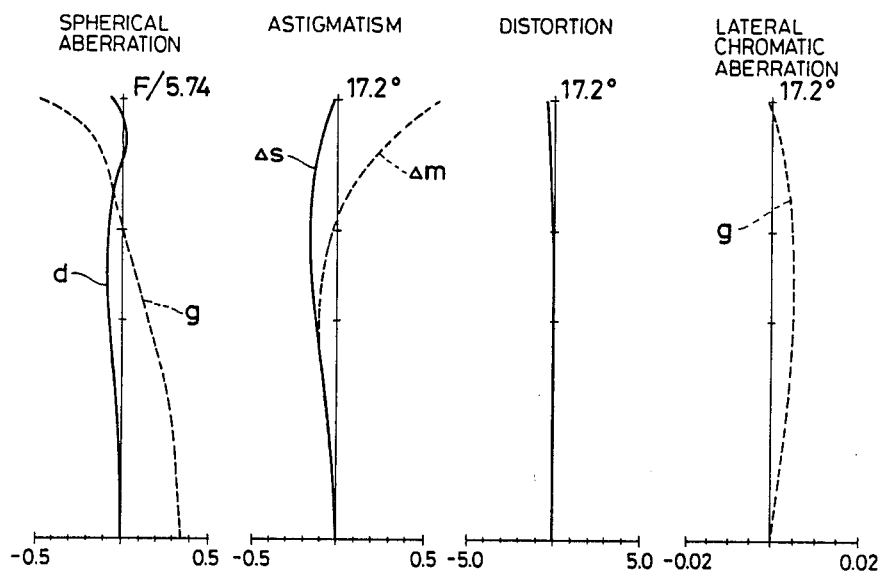

The Embodiment 10 has the composition illustrated in FIG. 11 wherein the sixth surface ($r_6$) is designed as an aspherical surface. The aberration characteristics of this embodiment are shown in FIG. 43, FIG. 44 and FIG. 45 respectively.

Figure 12:
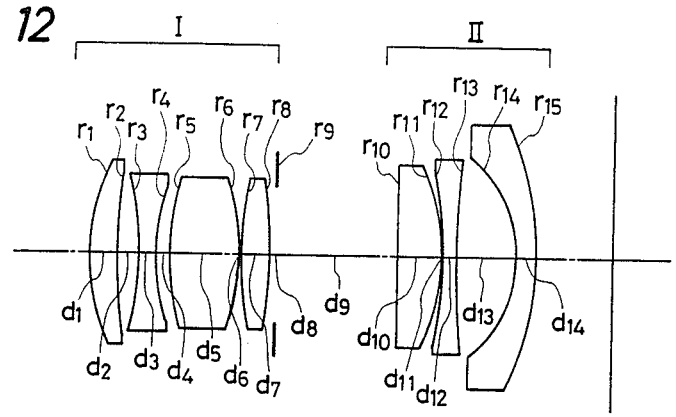
Figure 46:
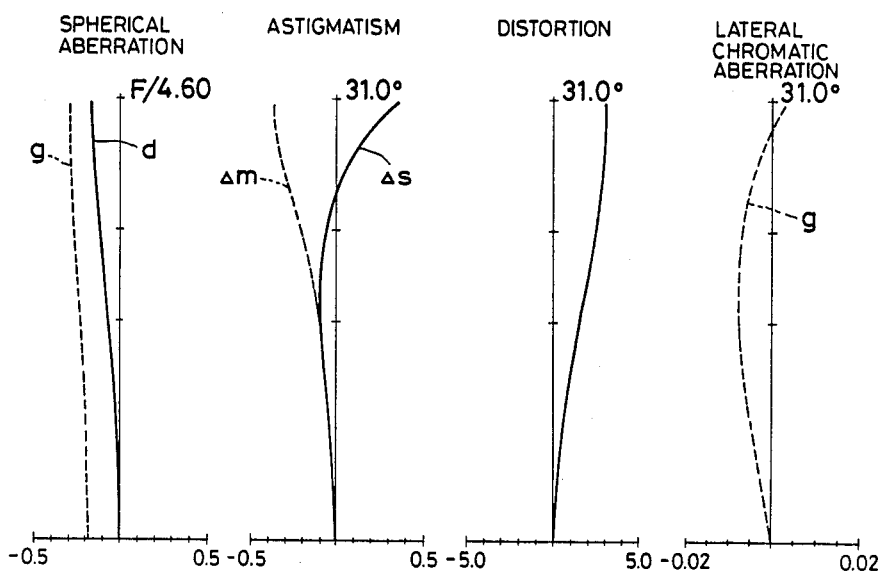
Figure 47:
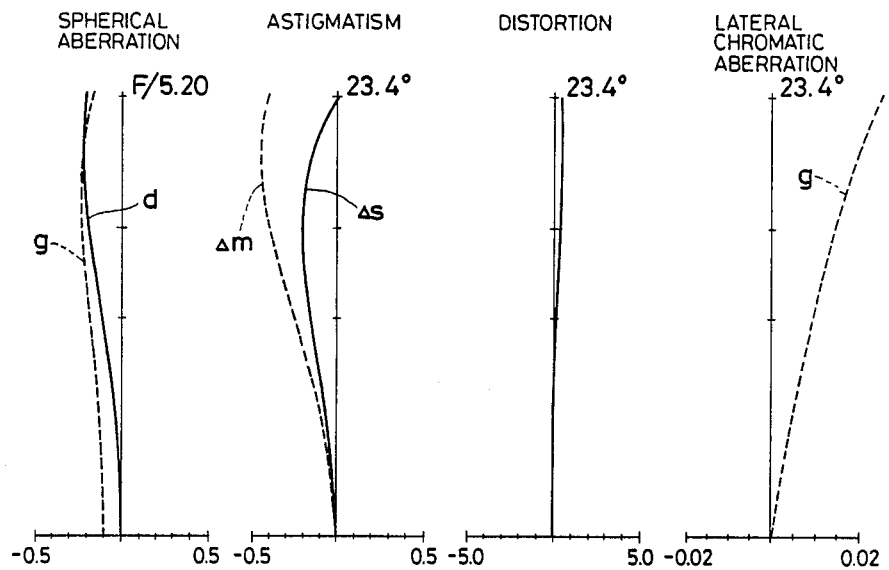
Figure 48:
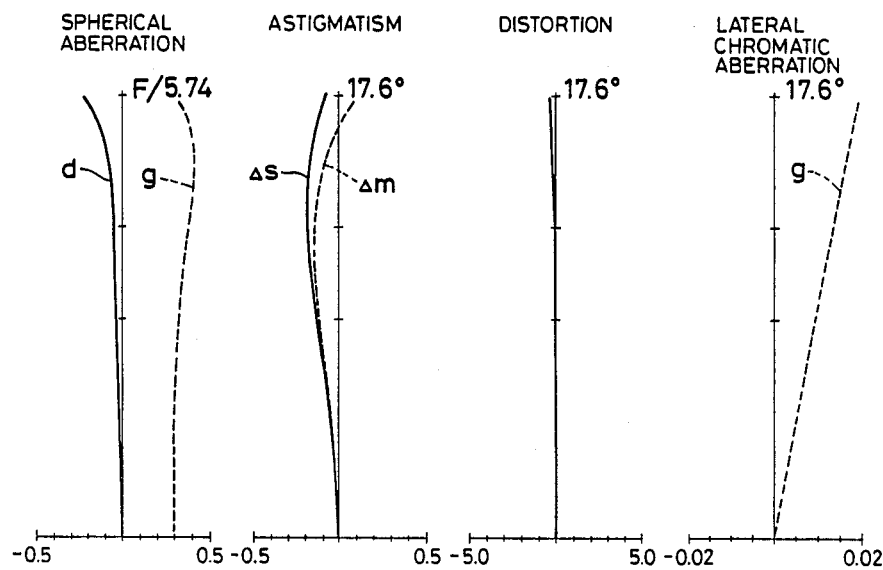

The Embodiment 11 has the composition illustrated in FIG. 12 wherein the eleventh surface ($r_{11}$) is designed as an aspherical surface. The aberration characteristics of this embodiment at the wide position, intermediate focal length and tele position are shown in FIG. 46, FIG. 47 and FIG. 48 respectively.

Figure 13:
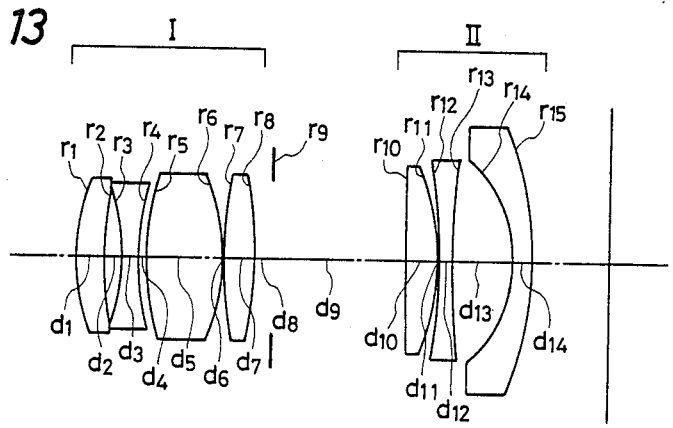
Figure 14:
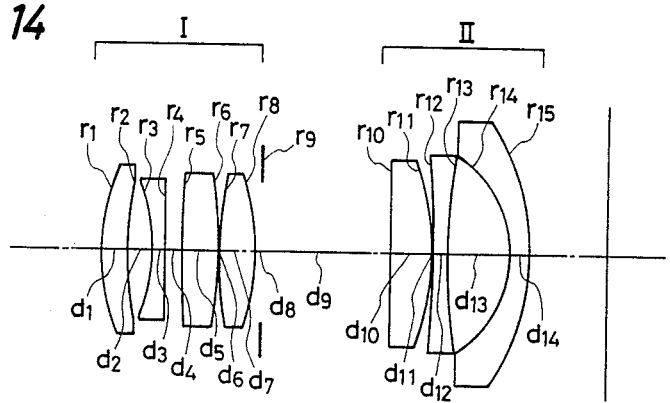
Figure 15:
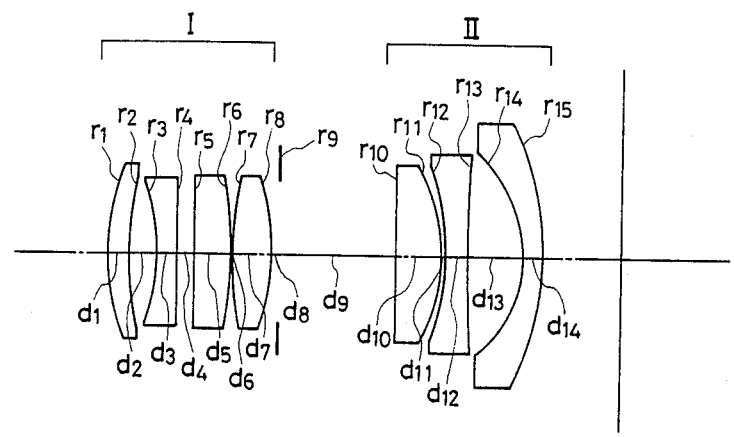
Figure 49:
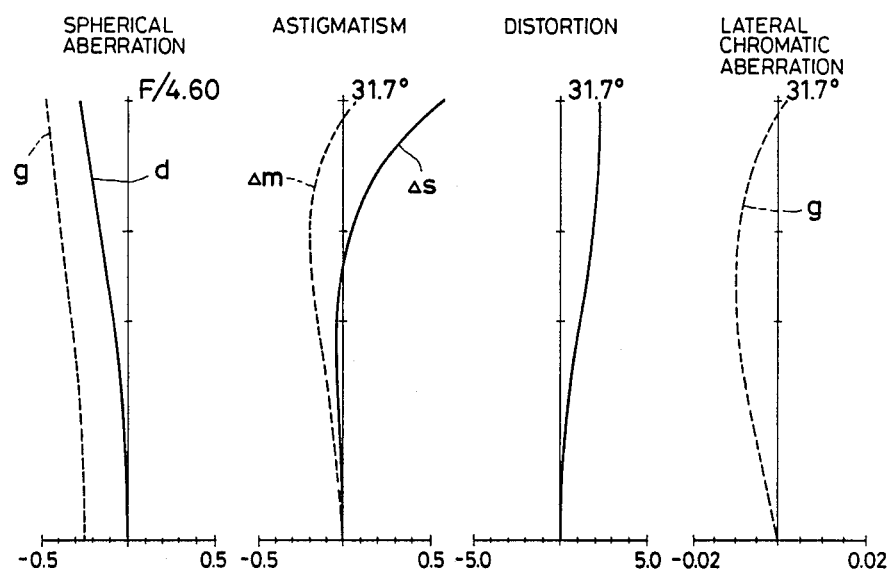
Figure 50:
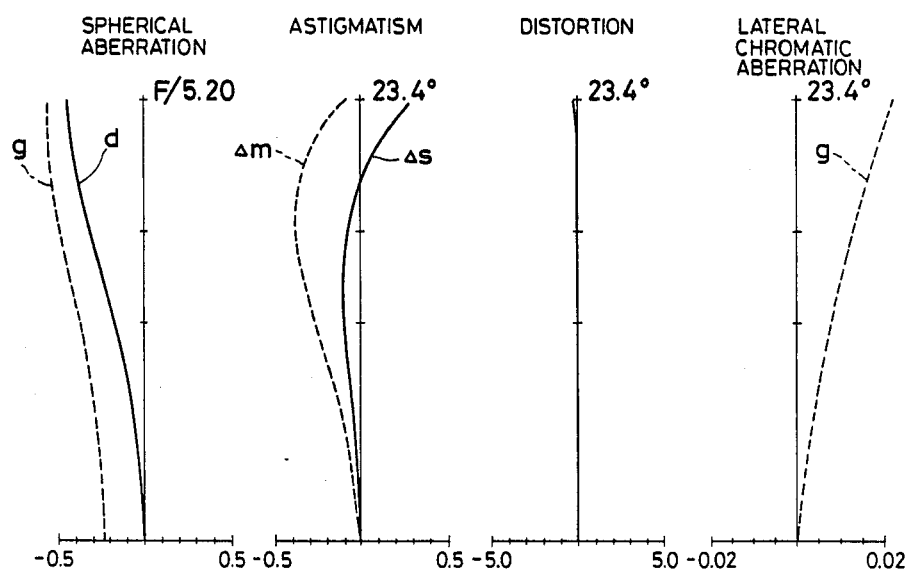
Figure 51:
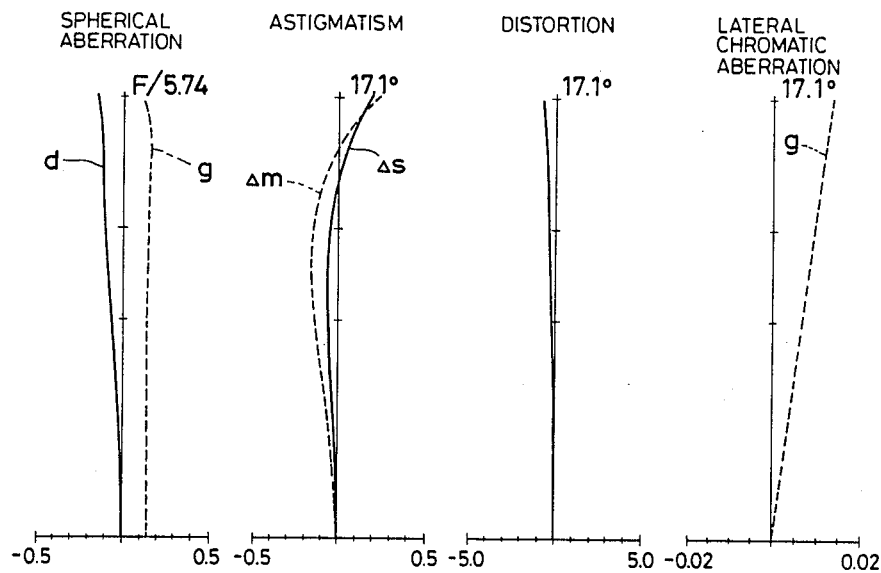
Figure 52:
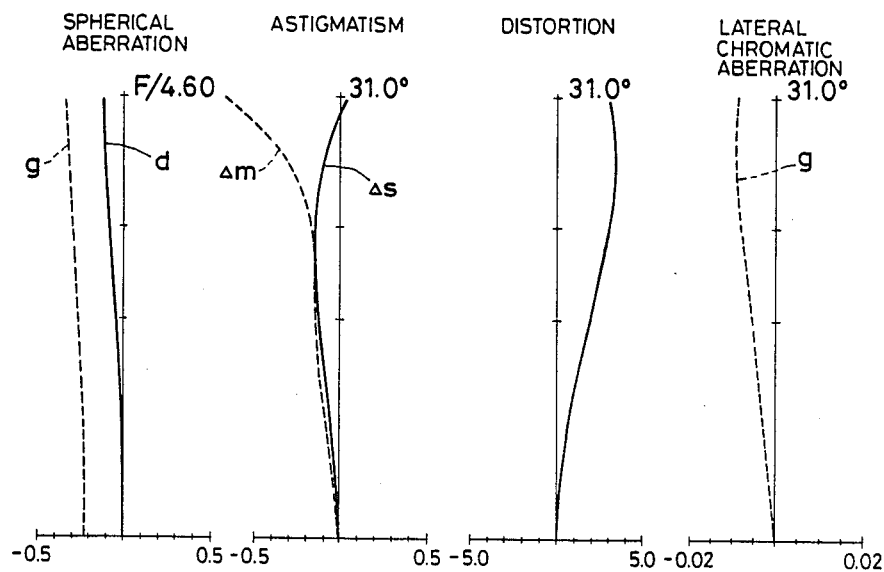
Figure 53:
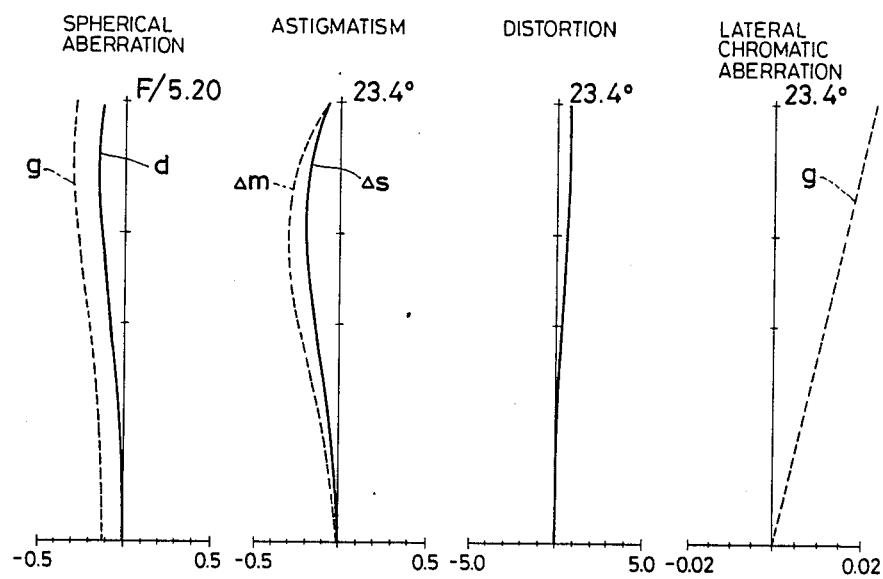
Figure 54:
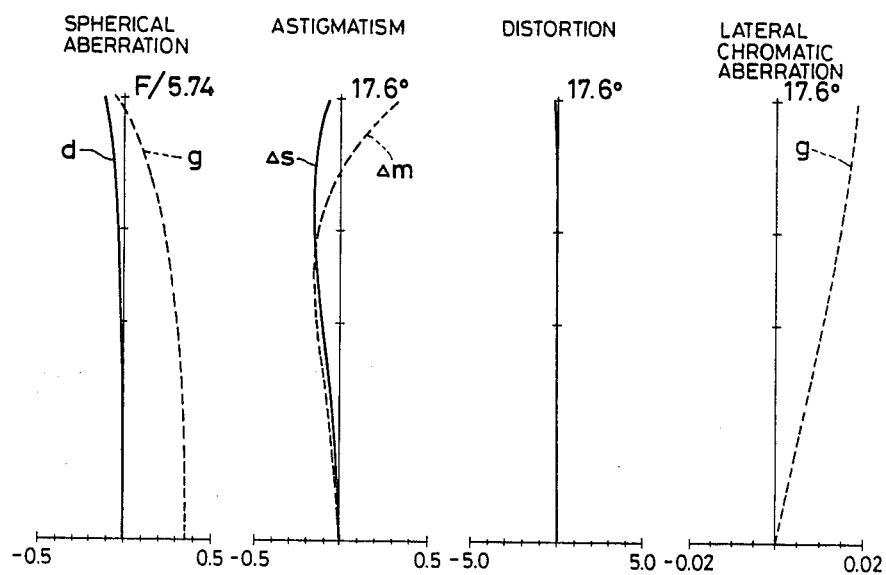
Figure 55:
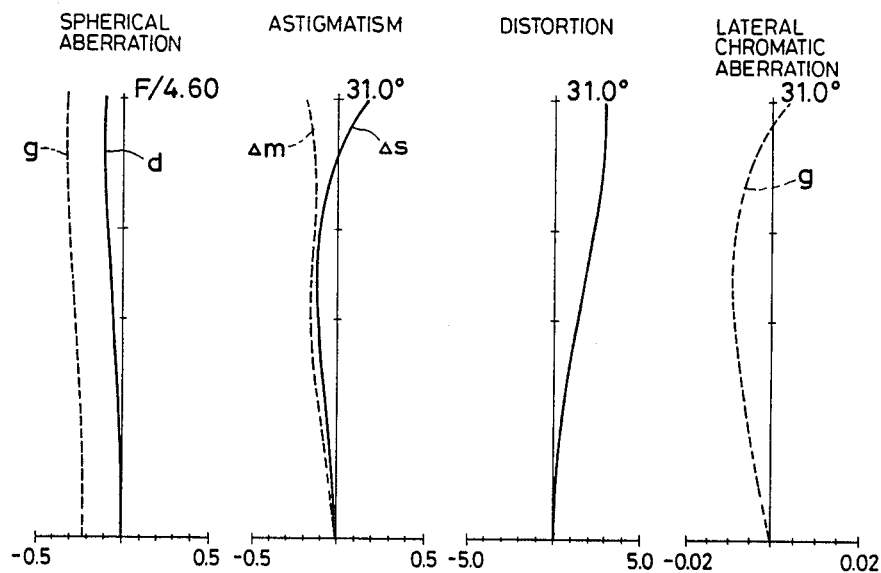
Figure 56:
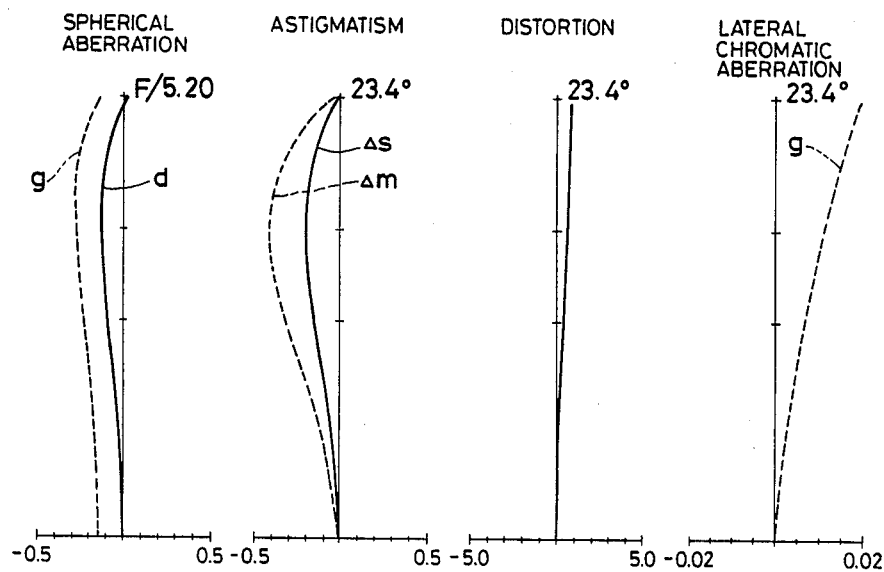
Figure 57:
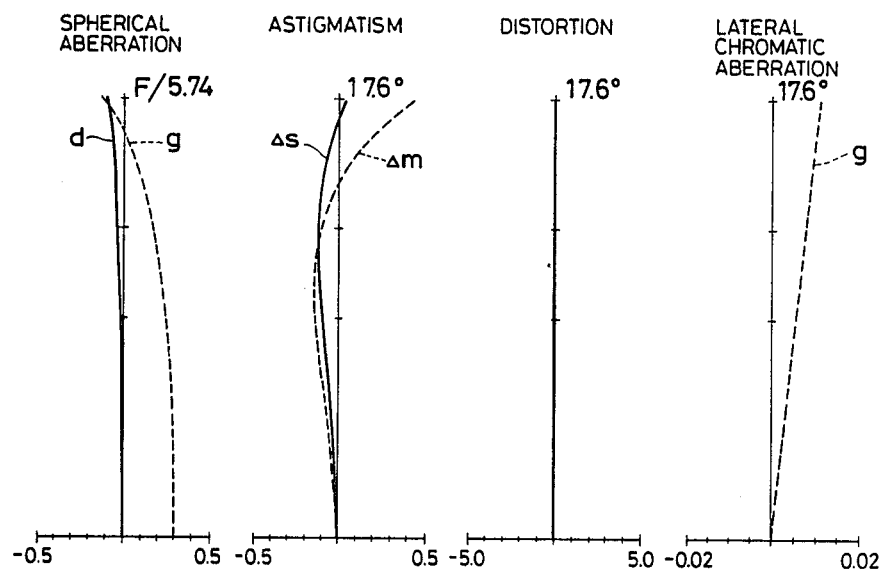

The Embodiment 12 has the composition illustrated in FIG. 13, and the aberration characteristics at the wide position, intermediate focal length and tele position shown in FIG. 49, FIG. 50 and FIG. 51 respectively. The Embodiment 13 has the composition illustrated in FIG. 14 wherein the eighth surface ($r_8$) and the eleventh surface ($r_{11}$) are designed as aspherical surfaces. The aberration characteristics of this embodiment at the wide position, intermediate focal length and tele position are shown in FIG. 52, FIG. 53 and FIG. 54 respectively. The Embodiment 14 has the composition illustrated in FIG. 15 wherein the eighth surface ($r_8$) and the eleventh surface ($r_{11}$) are designed as aspherical surfaces. The aberration characteristics of the Embodiment 14 are shown in FIG. 55, FIG. 56 and FIG. 57 respectively.

When the direction of the optical axis is represented by z, the direction perpendicular to the optical axis is designated by y and the paraxial radius of curvature is denoted by R, the aspherical surfaces used in the embodiment are expressed by the following formula:

$$z = \frac{y^2}{R + \sqrt{R^2 - (1+k)y^2}} + Ay^2 + By^4 + Cy^6 + Dy^8 + Ey^{10}$$

The values of the conic coefficient k, and aspherical coefficients A, B, C, D and E are specified in the numerical data described above. Out of the embodiments described above, the Embodiments 5 and 6 comprise a negative lens on the extreme image side in the front lens group I. Since this negative lens has weak power, it is possible to reduce manufacturing cost by using a plastic material for this lens. The Embodiment 5 comprises the above-mentioned negative lens made of a plastic material.

The zoom lens system according to the present invention features a compact design and high performance with a short total length of the lens system as a whole and short displacements of the lens groups for varying focal length while reserving the required focal length regardless of the high vari-focal ratio of 2.

We claim:

1. A compact zoom lens system comprising a front lens group having positive refractive power and a rear lens group having negative refractive power, and designed for changing focal length by varying an air-space reserved between said lens groups, said front lens group comprising in the order from the object side of a positive meniscus lens convex on the object side, a negative lens and at least one positive lens, said rear lens group comprising in the order from the object side, of a positive lens, a biconcave lens and a negative meniscus lens convex on the image side, and said zoom lens system beng so designed as to satisfy the following condition (1):

$$-1 < \frac{r_a + r_b}{r_a - r_b} < 0.2 \quad (1)$$

wherein the reference symbols $r_a$ and $r_b$ represent the radii of curvature on the object side surface and the image side surface respectively of the biconcave lens arranged in said rear lens group.

2. A compact zoom lens system according to claim 1 wherein said front lens group consists, in the order from the object side, of a positive meniscus lens convex on the object side, a negative lens and a positive lens.

3. A compact zoom lens system according to claim 1 wherein said front lens group consists, in the order from the object side, of a positive meniscus lens having a convex surface on the object side, a negative lens and two positive lenses.

4. A compact zoom lens system according to claim 3 satisfying the following conditions (3) through (6):

$$0.6 < f_I/f_W < 0.87 \quad (3)$$
$$0.8 < |f_{II}|/f_I < 1.6 \quad (4)$$
$$-2.4 < \frac{r_4 - r_5}{r_4 + r_5} \quad (5)$$
$$0.1 < d_5/f_3 < 0.6 \quad (6)$$

wherein the reference symbol $f_W$ represents the focal length of the zoom lens system as a whole, the reference symbol $f_I$ designates the focal length of said front lens group, the reference symbol $f_{II}$ denotes the focal length of said rear lens group, the reference symbol $r_4$ represents the radius of curvature on the image side surface of the negative lens arranged in said front lens group, the reference symbol $r_5$ designates the radius of curvature on the object side surface of the positive lens arranged on the image side of said negative lens in the front lens group, the reference symbol $d_5$ denotes the thickness of said positive lens and the reference symbol $f_3$ represents the focal length of said positive lens.

5. A compact zoom lens system according to claim 4 satisfying the following condition (7):

$$0.7 < |f_7|/|f_{II}| < 1.4 \quad (7)$$

wherein the reference symbol $f_7$ represents the focal length of the negative meniscus lens arranged in said rear lens group.

6. A compact zoom lens system according to claim 5 satisfying the following conditions (8) and (9):

$$\nu_5 > 30 \quad (8)$$
$$\nu_7 > 45 \quad (9)$$

wherein the reference symbols $\nu_5$ and $\nu_7$ represents the Abbe's numbers of said positive lens and the negative meniscus lens respectively.

7. A compact zoom lens system according to claim 1 wherein said front lens group consists, in the order from the object side, of a positive meniscus lens having a convex surface on the object side, a negative lens, two positive lenses and a negative meniscus lens having a convex surface on the image side.

8. A compact zoom lens system according to claim 7 satisfying the following conditions (10) through (13):

$$0.65 < f_I/f_W < 0.87 \quad (10)$$
$$0.55 < |f_{II}|/f_W < 1.1, \; f_{II} < 0 \quad (11)$$
$$6 < |f_A|/f_W, \; f_A < 0 \quad (12)$$
$$0.65 < |r_A|/f_W < 1.65, \; r_A < 0 \quad (13)$$

wherein the reference symbols $f_W$ represents the focal length of the zoom lens system as a whole at the wide position, the reference symbols $f_I$ and $f_{II}$ designate the focal lengths of said front lens group and said rear lens group respectively, the reference symbol $f_A$ denotes the focal length of the negative lens arranged on the extreme object side in said front lens group, and the reference symbol $r_A$ represents the radius of curvature on the object side surface of said negative lens.

9. A compact zoom lens system according to claim 1 satisfying the following additional condition (2):

$$1.15 < \beta_{IIW} < 1.7 \quad (2)$$

wherein the reference symbol $\beta_{IIW}$ represents the magnification level of said rear lens group at the wide position.

10. A compact zoom lens system according to claim 1 wherein said front lens group consists, in the order from the object side, of a positive meniscus lens having a convex surface on the object side, a negative lens, a positive lens and a negative meniscus lens having a convex surface on the image side.

11. A compact zoom lens system according to claim 10 satisfying the following conditions (10) through (13):

$$0.65 < f_I/f_W < 0.87 \quad (10)$$

-continued $$0.55 < |f_{II}|/f_W < 1.1, \quad f_{II} < 0 \quad (11)$$
$$6 < |f_A|/f_W, \quad f_A < 0 \quad (12)$$
$$0.65 < |r_A|/f_W < 1.65, \quad r_A < 0 \quad (13)$$

wherein the reference symbols $f_W$ represents the focal length of the zoom lens system as a whole at the wide position, the reference symbols $f_I$ and $f_{II}$ designate the focal lengths of said front lens group and said rear lens group respectively, the reference symbol $f_A$ denotes the focal length of the negative arranged on the extreme object side in said front lens group, and the reference symbol $r_A$ represents the radius of curvature on the object side surface of said negative lens.

12. A compact zoom lens system according to claim 1 satisfying the following conditions (2'), (11') and (5'):

$$1.2 < \beta_{IIW} < 1.5 \quad (2')$$
$$0.6 < |f_{II}|/f_W < 0.95, \quad f_{II} < 0 \quad (11')$$
$$\frac{r_4 - r_5}{r_4 + r_5} < 0.1 \quad (5')$$

wherein the reference symbol $f_W$ represents the focal length of the zoom lens system as a whole, the reference symbol $\beta_{IIW}$ designates the magnification level of said rear lens group at the wide position, the reference symbol $f_{II}$ denotes the focal length of said rear lens group, the reference symbol $r_4$ represents the radius of curvature on the image side surface of the negative lens arranged in said front lens group and the reference symbol $r_5$ designates the radius of curvature on the object side surface of the positive lens arranged on the image side of said negative lens in the front lens group.

* * * * *